United States Patent
Muniraju et al.

(10) Patent No.: US 10,941,826 B2
(45) Date of Patent: Mar. 9, 2021

(54) DETERMINING ESTIMATED REMAINING USE OF BRAKE ASSEMBLY

(71) Applicant: Honeywell International Inc., Morris Plains, NJ (US)

(72) Inventors: Raghavendra Muniraju, Bangalore (IN); Vedavyas Rallabandi, Bangalore (IN); Pradeep Huncha, Bangalore (IN); Shajahan Sheriff, Bangalore (IN); Kathiresan Sundarappan, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 184 days.

(21) Appl. No.: 16/129,316

(22) Filed: Sep. 12, 2018

(65) Prior Publication Data

US 2020/0080609 A1    Mar. 12, 2020

(51) Int. Cl.
*F16D 66/02*    (2006.01)
*B60T 17/22*    (2006.01)
*G01D 5/16*    (2006.01)
*G01D 5/40*    (2006.01)
*G01D 5/42*    (2006.01)

(52) U.S. Cl.
CPC .......... *F16D 66/027* (2013.01); *B60T 17/221* (2013.01); *F16D 66/028* (2013.01); *G01D 5/16* (2013.01); *G01D 5/40* (2013.01); *G01D 5/42* (2013.01)

(58) Field of Classification Search
CPC .... F16D 66/027; F16D 66/028; F16D 66/023; F16D 66/02; B60T 17/221; B60T 17/22; G01D 5/16; G01D 5/40; G01D 5/42
See application file for complete search history.

(56) References Cited

U.S. PATENT DOCUMENTS

| 576,671 | A | 2/1897 | Hamlin |
| 2,522,181 | A | 9/1950 | Krikorian |
| 3,604,865 | A | 9/1971 | Bricker |
| 4,013,143 | A | 3/1977 | Juhasz |
| 4,107,604 | A | 8/1978 | Bernier |
| 4,184,145 | A | 1/1980 | Fima |

(Continued)

FOREIGN PATENT DOCUMENTS

| CN | 102874247 A | 1/2013 |
| CN | 108006116 A | 5/2018 |

(Continued)

OTHER PUBLICATIONS

Examination Report from counterpart European Application No. 19195763.8, dated Feb. 25, 2020, 10 pp.

(Continued)

*Primary Examiner* — Freddie Kirkland, III
(74) *Attorney, Agent, or Firm* — Shumaker & Sieffert, P.A.

(57) ABSTRACT

In some examples, a device configured to determine an estimated remaining use of a brake assembly includes a magnet configured to move in response to movement of a wear pin indicator of the brake assembly, a sensor configured to generate an output signal based on a position of the magnet relative to the sensor, and processing circuitry configured to determine the estimated remaining use of the brake assembly based on the output signal generated by the sensor.

20 Claims, 15 Drawing Sheets

(56) References Cited

U.S. PATENT DOCUMENTS

| | | |
|---|---|---|
| 4,279,214 A | 7/1981 | Thorn |
| 4,318,955 A | 3/1982 | Kulakov et al. |
| 4,495,464 A | 1/1985 | Kozai et al. |
| 4,520,661 A | 6/1985 | Tamai et al. |
| 4,550,815 A | 11/1985 | Gale |
| 4,583,071 A | 4/1986 | Sebalos et al. |
| 4,642,603 A | 2/1987 | Martinez, Jr. |
| 4,658,936 A | 4/1987 | Moseley |
| 4,664,239 A | 5/1987 | Symes et al. |
| 4,757,300 A | 7/1988 | Sebalos |
| 4,776,438 A | 10/1988 | Schandelmeier |
| 4,852,404 A | 8/1989 | Catanese |
| 4,855,712 A | 8/1989 | Wiley, Jr. et al. |
| 4,989,537 A | 2/1991 | Hutchinson, Sr. et al. |
| 5,035,303 A | 7/1991 | Sullivan |
| 5,044,302 A | 9/1991 | Goldfein et al. |
| 5,087,907 A | 2/1992 | Weiler et al. |
| 5,125,280 A | 6/1992 | Koscinski et al. |
| 5,148,107 A | 9/1992 | Finger et al. |
| 5,186,284 A | 2/1993 | Lamela et al. |
| 5,228,541 A | 7/1993 | Plude |
| 5,251,729 A | 10/1993 | Nehl et al. |
| 5,255,760 A | 10/1993 | Lamb et al. |
| 5,255,761 A | 10/1993 | Zaremsky |
| 5,310,023 A | 5/1994 | Martinez |
| 5,327,782 A | 7/1994 | Sato et al. |
| 5,338,320 A | 8/1994 | Fukuda et al. |
| 5,388,320 A | 2/1995 | Smith et al. |
| 5,410,293 A | 4/1995 | Angerfors |
| 5,433,296 A | 7/1995 | Webberley |
| 5,450,930 A | 9/1995 | Martens et al. |
| 5,474,154 A | 12/1995 | Coale |
| 5,494,138 A | 2/1996 | Scelsi et al. |
| 5,717,174 A | 2/1998 | Ramos |
| 5,767,768 A | 6/1998 | DiSaverio |
| 5,825,287 A | 10/1998 | Zarybnicky, Sr. et al. |
| 5,848,672 A | 12/1998 | Brearley et al. |
| 5,882,781 A | 3/1999 | Lawton et al. |
| 5,906,253 A | 5/1999 | Rancourt et al. |
| 5,934,415 A | 8/1999 | Preston et al. |
| 5,952,075 A | 9/1999 | Clarke et al. |
| 5,967,266 A | 10/1999 | Carnegie |
| 5,973,996 A | 10/1999 | Zhevelev et al. |
| 6,003,640 A | 12/1999 | Ralea |
| 6,077,464 A | 6/2000 | Murdie et al. |
| 6,112,859 A | 9/2000 | Shuck et al. |
| 6,183,583 B1 | 2/2001 | Duval et al. |
| 6,202,811 B1 | 3/2001 | Wallrafen |
| 6,237,723 B1 | 5/2001 | Salsman |
| 6,257,374 B1 | 7/2001 | Strzelczyk et al. |
| 6,328,144 B1 | 12/2001 | Hayakawa et al. |
| 6,342,171 B1 | 1/2002 | Murdie et al. |
| 6,352,137 B1 | 3/2002 | Stegall et al. |
| 6,356,072 B1 | 3/2002 | Chass |
| 6,365,257 B1 | 4/2002 | Hecht |
| 6,366,201 B1 | 4/2002 | Hanisko |
| 6,411,206 B1 | 6/2002 | Weant et al. |
| 6,460,659 B1 | 10/2002 | Schaffer et al. |
| 6,537,470 B1 | 3/2003 | Wood et al. |
| 6,634,465 B1 | 10/2003 | Tuschen |
| 6,659,233 B2 | 12/2003 | DeVlieg |
| 6,691,393 B2 | 2/2004 | James et al. |
| 6,702,069 B2 | 3/2004 | Ralea et al. |
| 6,696,937 B1 | 4/2004 | Kiefer |
| 6,719,102 B2 | 4/2004 | Takanashi |
| 6,753,771 B2 | 6/2004 | Lesesky |
| 6,776,266 B2 | 8/2004 | Fuglewicz et al. |
| 6,929,333 B2 | 8/2005 | DeVlieg |
| 6,939,490 B2 | 9/2005 | La Forest et al. |
| 7,014,016 B2 | 3/2006 | Morris et al. |
| 7,025,913 B2 | 4/2006 | La Forest et al. |
| 7,086,503 B2 | 8/2006 | Miller et al. |
| 7,108,107 B2 | 9/2006 | Ralea et al. |
| 7,114,596 B2 | 10/2006 | Borugian |
| 7,172,408 B2 | 2/2007 | Wood et al. |
| 7,252,499 B2 | 8/2007 | La Forest et al. |
| 7,322,447 B2 | 1/2008 | Deckhut et al. |
| 7,374,709 B2 | 5/2008 | Bauer |
| 7,525,062 B2 | 4/2009 | Adam et al. |
| 7,535,131 B1 | 5/2009 | Safieh, Jr. |
| 7,610,998 B2 | 11/2009 | Baumgartner et al. |
| 7,673,721 B2 | 3/2010 | Bailey et al. |
| 7,766,130 B2 | 8/2010 | Walker et al. |
| 7,808,374 B2 | 10/2010 | Schmitt et al. |
| 7,877,216 B2 | 1/2011 | Wright et al. |
| 8,207,729 B2 | 6/2012 | Erickson et al. |
| 8,405,386 B2 | 3/2013 | Erickson et al. |
| 8,717,159 B2 | 5/2014 | Todd et al. |
| 8,978,457 B2 * | 3/2015 | Naether ............... B60T 7/042 |
| | | 73/129 |
| 9,017,761 B2 | 4/2015 | La Forest et al. |
| 9,146,308 B2 | 9/2015 | Mahajan |
| 9,279,468 B1 * | 3/2016 | Philpott ............. F16D 55/2265 |
| 9,353,816 B2 | 5/2016 | La Forest et al. |
| 9,441,692 B2 | 9/2016 | Schaefer |
| 9,482,301 B2 | 11/2016 | Lamkin et al. |
| 9,511,755 B2 * | 12/2016 | Seglo ..................... B60T 17/22 |
| 9,797,416 B2 * | 10/2017 | Giese ................. F15B 15/2892 |
| 9,855,940 B2 * | 1/2018 | Wallace ................ B60T 17/221 |
| 10,471,947 B1 * | 11/2019 | Sheriff .................... G01B 17/00 |
| 2001/0019752 A1 | 9/2001 | Purdy et al. |
| 2002/0089327 A1 | 7/2002 | Spellman |
| 2002/0170787 A1 | 11/2002 | James et al. |
| 2003/0100239 A1 | 5/2003 | Gaffney et al. |
| 2003/0214064 A1 | 11/2003 | Shin et al. |
| 2004/0105969 A1 | 6/2004 | Huang et al. |
| 2004/0251090 A1 | 12/2004 | Morris et al. |
| 2005/0054301 A1 | 3/2005 | Brown et al. |
| 2005/0168721 A1 | 8/2005 | Huang |
| 2005/0269873 A1 | 12/2005 | DeVlieg |
| 2006/0042734 A1 | 3/2006 | Turner et al. |
| 2006/0046059 A1 | 3/2006 | Arico et al. |
| 2006/0108182 A1 | 5/2006 | Walker et al. |
| 2006/0151912 A1 | 7/2006 | Bauer |
| 2006/0177663 A1 | 8/2006 | Simpson et al. |
| 2006/0191751 A1 | 8/2006 | Miller et al. |
| 2006/0219487 A1 | 10/2006 | Wille et al. |
| 2006/0232392 A1 | 10/2006 | Emmett et al. |
| 2006/0279012 A1 | 12/2006 | Simpson et al. |
| 2007/0125607 A1 | 6/2007 | Ralea et al. |
| 2007/0186396 A1 | 8/2007 | Linck et al. |
| 2007/0270069 A1 | 11/2007 | Lee et al. |
| 2008/0041674 A1 | 2/2008 | Walker et al. |
| 2008/0073161 A1 | 3/2008 | Pettersson et al. |
| 2008/0090064 A1 | 4/2008 | James et al. |
| 2008/0190712 A1 | 8/2008 | Hagberg |
| 2008/0202865 A1 | 8/2008 | Pradier et al. |
| 2009/0050418 A1 | 2/2009 | Vargas et al. |
| 2009/0120735 A1 | 5/2009 | DeVlieg |
| 2009/0177362 A1 | 7/2009 | Schmitt et al. |
| 2009/0194895 A1 | 8/2009 | La Forest et al. |
| 2009/0205910 A1 | 8/2009 | Cahill |
| 2009/0229926 A1 | 9/2009 | Schaefer |
| 2010/0207608 A1 | 8/2010 | Erickson et al. |
| 2010/0250028 A1 | 9/2010 | DeVlieg |
| 2010/0286881 A1 | 11/2010 | Cahill |
| 2011/0013173 A1 | 1/2011 | Luo et al. |
| 2011/0033622 A1 | 2/2011 | La Forest et al. |
| 2011/0111123 A1 | 5/2011 | La Forest et al. |
| 2012/0226457 A1 | 9/2012 | Erickson et al. |
| 2016/0041058 A1 | 2/2016 | Georgin et al. |
| 2016/0225130 A1 | 8/2016 | Venkatesha et al. |
| 2016/0281808 A1 | 9/2016 | Lamkin et al. |
| 2019/0018107 A1 | 1/2019 | Warke et al. |
| 2020/0149860 A1 * | 5/2020 | Huang ..................... G01B 5/06 |
| 2020/0173509 A1 * | 6/2020 | Stein ..................... F16D 66/021 |

FOREIGN PATENT DOCUMENTS

| | | |
|---|---|---|
| DE | 3220773 A1 | 12/1983 |
| DE | 102005013142 A1 | 9/2006 |
| DE | 102007026463 A1 | 12/2007 |
| EP | 1538364 A1 | 6/2005 |
| EP | 1724245 A1 | 11/2006 |

(56) References Cited

FOREIGN PATENT DOCUMENTS

| | | |
|---|---|---|
| EP | 1911990 A2 | 4/2008 |
| EP | 1911990 A3 | 4/2009 |
| EP | 2093453 A1 | 8/2009 |
| FR | 2874675 A1 | 3/2006 |
| GB | 2302574 A | 1/1997 |
| GB | 2386951 A | 10/2003 |
| GB | 2470098 A | 11/2010 |
| JP | 2013088196 A | 5/2013 |
| WO | 9827023 A1 | 6/1998 |
| WO | 9849382 A1 | 11/1998 |
| WO | 0061518 A1 | 10/2000 |
| WO | 02/29274 A1 | 4/2002 |
| WO | 2004106766 A | 12/2004 |
| WO | 2006101799 A2 | 6/2006 |
| WO | 2017149276 A1 | 9/2017 |
| WO | 2018/022615 A1 | 2/2018 |

OTHER PUBLICATIONS

Response to Examination Report dated Feb. 25, 2020, from counterpart European Application No. 19195763.8, filed May 7, 2020, 26 pp.

"Multiple-Disk Brake Assembly of Boeing 737," Flight Mechanic, retrieved from http://www.flight-mechanic.com/wp-content/uploads/2017/11/13-88.jpg, Nov. 13, 2017, 1 pp.

U.S. Appl. No. 15/964,279, filed by Shajahan Sheriff et al., filed Apr. 27, 2018.

Examination Report from counterpart European Application No. 19195763.8, dated Sep. 4, 2020, 4 pp.

Response to Examination Report dated Sep. 4, 2020, from counterpart European Application No. 19195763.8, filed Oct. 30, 2020, 63 pp.

\* cited by examiner

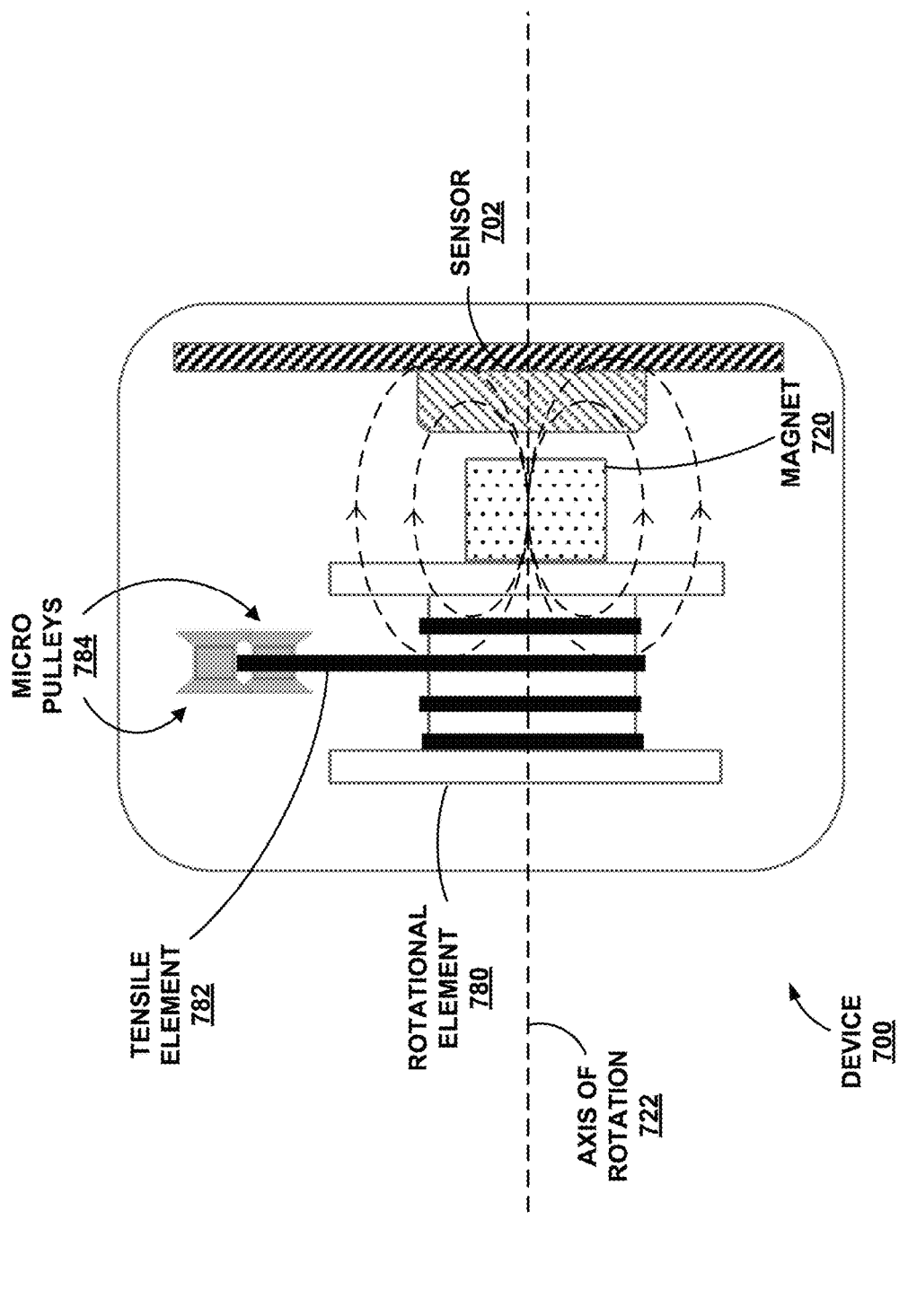

DETERMINING ESTIMATED REMAINING USE OF BRAKE ASSEMBLY

TECHNICAL FIELD

The disclosure relates to vehicle brake systems.

BACKGROUND

During periodic maintenance, the amount of wear on a vehicle's braking assembly is manually assessed by a maintenance technician. On an aircraft, for example, the remaining use of the braking assembly is determined by observing the length of a wear pin indicator, also known as a wear pin or a brake wear pin.

SUMMARY

In general, this disclosure describes systems and methods for determining the estimated remaining use of a brake assembly. In some examples, the determination may include a magnet and sensor, where the magnet moves in response to movement of a wear pin indicator of the brake assembly. The sensor may be configured to generate an output signal indicating a position of the magnet relative to the sensor. Additionally or alternatively, a reflector element may be configured to move in response to movement of the wear pin indicator. A transceiver can transmit a measurement signal and receive a reflection of the measurement signal off the reflector element. Processing circuitry is configured to determine the estimated remaining use of the brake assembly based on an output signal from a sensor and/or a reflection of a measurement signal.

In some examples, a device is configured to determine an estimated remaining use of a brake assembly and includes a magnet configured to move in response to movement of a wear pin indicator of the brake assembly. The device further includes a sensor configured to generate an output signal based on a position of the magnet relative to the sensor. The device also includes processing circuitry configured to determine the estimated remaining use of the brake assembly based on the output signal generated by the sensor.

In some examples, a device is configured to determine an estimated remaining use of a brake assembly and includes a reflector element configured to move in response to movement of a wear pin indicator of the brake assembly. The device further includes a transceiver configured to transmit a measurement signal toward a surface of the reflector element and receive a reflection of the measurement signal off the surface. The device also includes processing circuitry configured to determine the estimated remaining use of the brake assembly based on the reflection of the measurement signal received by the transceiver.

In some examples, a method of determining an estimated remaining use of a brake assembly, includes receiving an output signal generated by a sensor based on a position of a magnet relative to the sensor, wherein the magnet is configured to move in response to movement of a wear pin indicator of the brake assembly. The method also includes determining an estimated remaining use of the brake assembly based on the output signal generated by the sensor.

In some examples, a device includes a computer-readable medium having executable instructions stored thereon, wherein the instructions are configured to be executable by one or more processors for causing the one or more processors to receive an output signal generated by a sensor based on a position of a magnet relative to the sensor. The instructions are configured to be executable by the processing circuitry for further causing the processing circuitry to determine an estimated remaining use of a brake assembly based on the output signal.

BRIEF DESCRIPTION OF DRAWINGS

FIGS. 4-6A are diagrams depicting devices for measuring the length of a wear pin indicator with a transceiver, in accordance with some examples of this disclosure.

FIG. 7B is a diagram depicting a side view of the device shown in FIG. 7A, in accordance with some examples of this disclosure.

DETAILED DESCRIPTION

Figure 1A:
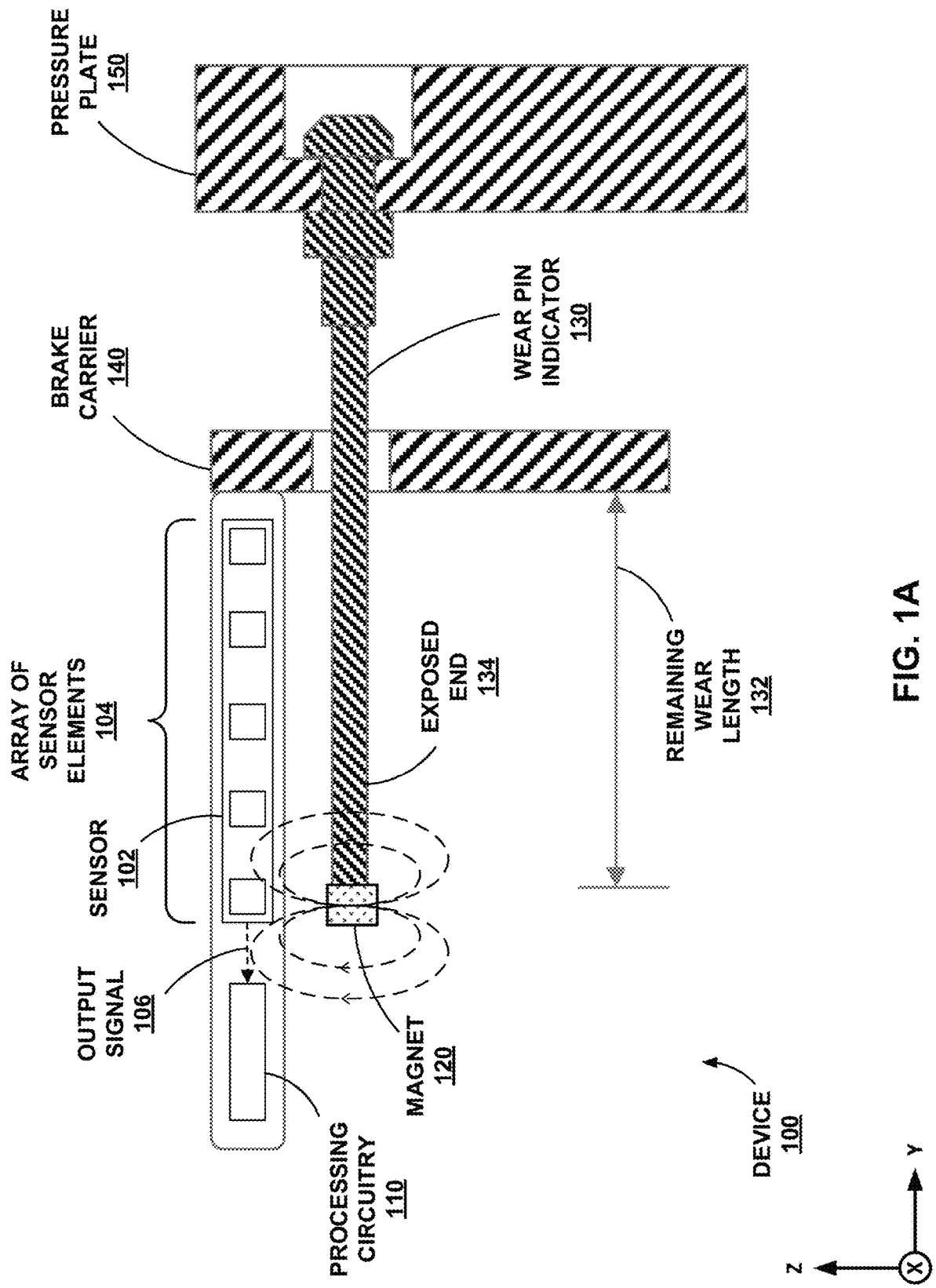
FIG. 1A is a diagram depicting a device for measuring the length of a wear pin indicator with an array of sensor elements, in accordance with some examples of this disclosure.

This disclosure describes techniques for determining an estimated remaining use of a brake assembly based on a length of a wear pin indicator (e.g., a wear pin, a brake wear pin, a wear indicator, and/or a wear indicator pin) in the brake assembly. In some examples, a sensor is configured to generate an output signal based on the position of a magnet that moves in response to movement of the wear pin indicator. The output signal can indicate the position of the magnet relative to the sensor, which may indicate the length of the wear pin indicator. Processing circuitry may be configured to determine the estimated remaining use of the brake assembly based on the output signal. FIGS. 1A, 2, 3, 7A, and 8 shows example configurations including a magnet and a sensor.

In some examples, a transceiver is configured to transmit a measurement signal towards a reflector element and receive a reflection of the measurement signal from the reflector element. The reflector element may be configured to move in response to movement of a wear pin indicator. Processing circuitry may be configured to determine the estimated remaining use of the brake assembly based on the reflection of the measurement signal. For example, the processing circuitry may be configured to determine the time difference between the transmission of the measurement signal and the receipt of the reflection of the measurement signal. The processing circuitry may be configured to determine an estimated remaining use of the brake assembly based on the time difference.

In some examples, the processing circuitry is configured to determine the distance between the transceiver and the reflector element based on the time difference and determine the length of the wear pin indicator based on that distance. The processing circuitry may be configured to determine the estimated remaining use based on an estimated rate of wear for a brake lining of the braking assembly. FIGS. 4-6A show example configurations including a reflector element and a transceiver.

Determining a length of a wear pin indicator is described herein with the understanding that the length of the wear pin indicator corresponds to the amount of use or estimated life of the brake assembly. It should be understood however that when implemented by processing circuitry, the processing circuitry does not necessarily need to determine a length of the wear pin indicator as an input or output variable and may just map an output signal or a time difference to the estimated life of the brake assembly. The mapping, which may be stored to a memory device, can associate signal characteristics and/or times with estimated remaining uses for the brake assembly. The mapping can be based on an equation, a lookup table, or a data structure and may include data such as amplitude, signal strength, time, distance, length, remaining use, and wear rates.

A device of this disclosure can be installed in an existing brake assembly as a retrofit sensor (e.g., an after-market product), or the device can be built into a new brake assembly. In some examples, the device is installed such that the sensor and/or the transceiver does not touch the wear pin indicator. The processing circuitry may be configured to determine and track the length of the wear pin indicator as the length declines over the life of the brake assembly. The processing circuitry may also be configured to output data indicating the length(s) of the wear pin indicator and/or estimate(s) of the remaining use of the brake assembly.

Other methods of assessing the length of a brake assembly's wear pin indicator are not proactive, as they require a second person in the cockpit of the aircraft to apply the brakes or to set the parking brake before the pin can be observed. Additionally, these other methods are not known to automatically store wear data for brake-wear trend analysis. Thus, the techniques of this disclosure may enable a technician to more easily determine and analyze the length of the wear pin indicator. Additionally, because the brakes are replaced when a technician observes that the wear pin indicator is flush or nearly flush with the surface of the brake carrier, the brakes may not be used to the fullest extent of their remaining use (e.g., remaining life or remaining lifespan). A device of this disclosure may output indications of the position of a magnet, the distance between a transceiver and a reflector element, the length of the wear pin indicator, the remaining use of the braking assembly, an alert, and/or other data determined by the processing circuitry. The device may generate more accurate notifications of the remaining use of a brake assembly, as compared to a caliper measurement, allowing maintenance workers to change the brakes at an appropriate time. Accurate notifications can allow maintenance workers to get all of the useful life out of the brakes, without the risk that replacement will be postponed too long. The processing circuitry can trend the obtained data for prognosis of the remaining use of the brake assembly. In some examples, one-tenth of one inch of length on the wear pin indicator may last approximately one hundred braking events.

A monolithic construction of the proposed device can be placed on top of the brake system's carrier, surrounding the wear pin indicator. A magnet and/or a reflector element can be attached to the exposed end of the wear pin indicator. A sensor and/or a transceiver can be installed nearby the magnet or reflector element. The sensor and/or transceiver need not be in physically contact with the wear pin indicator to conduct a measurement. The sensor generates an output signal in response to the magnetic field produced by the magnet. The strength of the magnetic field is based on the relative positions of the magnet and the sensor. The processing circuitry may be configured to determine the estimated remaining use based on the output signal(s).

A transceiver sends pulsed signals on the transmitter and receives the signals on the receiver. The processing circuitry may then measure the time taken for the light to travel from transmitter to receiver. Using the known speed of light, or any other applicable speed of the signals, the processing circuitry can determine the distance between the transceiver and the reflector element. The processing circuitry can interpret this information to determine the wear pin indicator length. Using a molding manufacturing process, the proposed device can be constructed so that the device can withstand the harsh environment conditions of an aircraft wheel. This method of measuring the length of the wear pin indicator may not require human intervention because the processing circuitry may be configured to output an indication of the estimated remaining use and/or the length of the wear pin indicator. The processing circuitry can measure and log data automatically and more frequently than other brake wear devices. This device may enable a vehicle operator, through a computing system located in an avionics bay, to apply algorithms on the measured data and predict the wear remaining on a brake assembly and plan for maintenance more efficiently.

FIG. 1A is a diagram depicting a device for measuring the length of a wear pin indicator 130 with an array of sensor elements 104, in accordance with some examples of this disclosure. Device 100 includes sensor 102, processing circuitry 110, and magnet 120. Device 100, or any other device described in this disclosure, can be physically attached to a brake assembly of a vehicle, such as an aircraft or a helicopter, a space vehicle such as a satellite or spaceship, a land vehicle such as an automobile, a manned vehicle, an unmanned vehicle such as a drone, a remote-control vehicle, or any suitable vehicle without any pilot or crew on board. The brake assembly includes wear pin indicator 130, brake carrier 140, and pressure plate 150.

Figure 2:
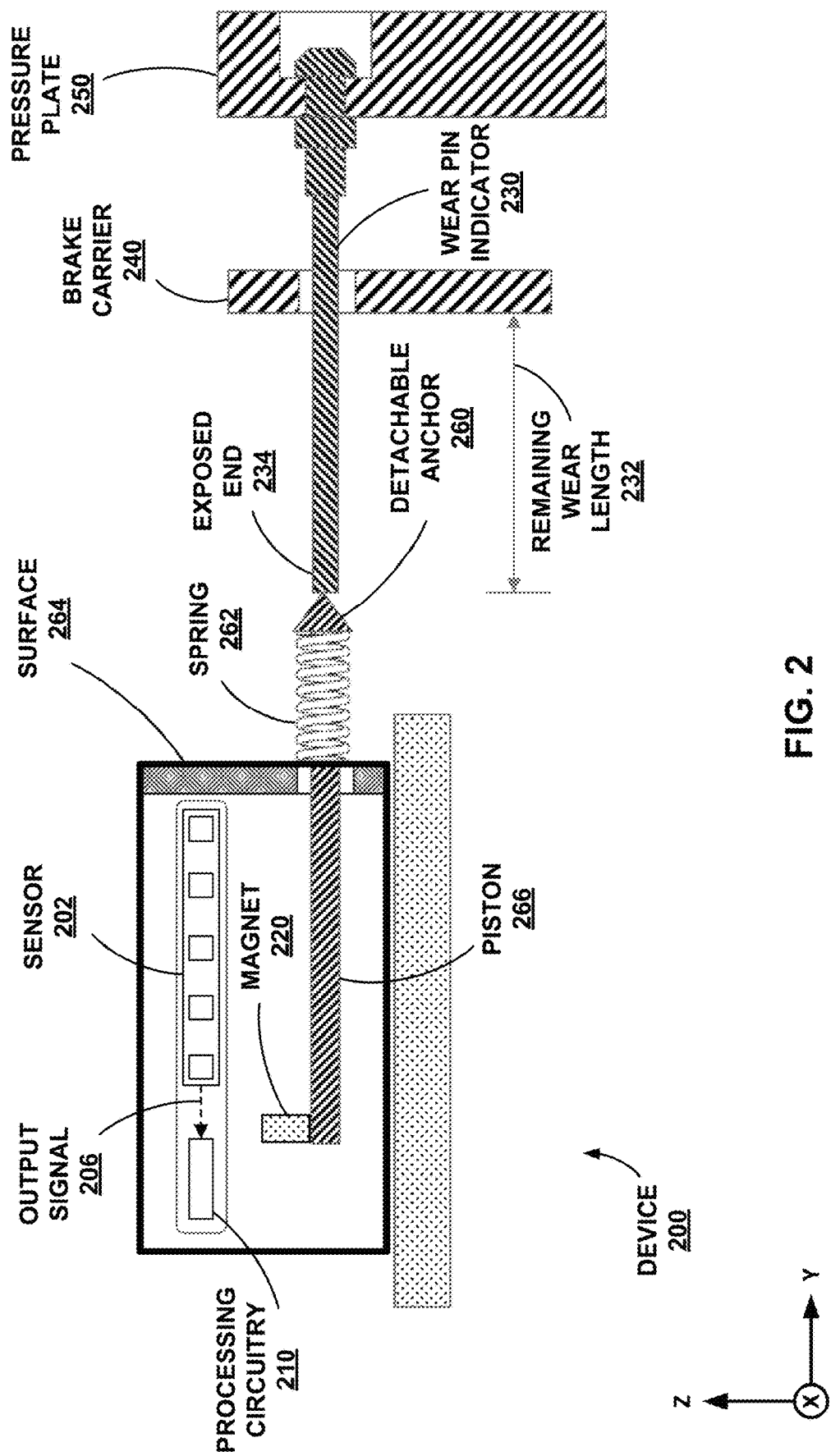
FIG. 2 is a diagram depicting a device for measuring the length of a wear pin indicator with a sensor, in accordance with some examples of this disclosure.
Figure 3:
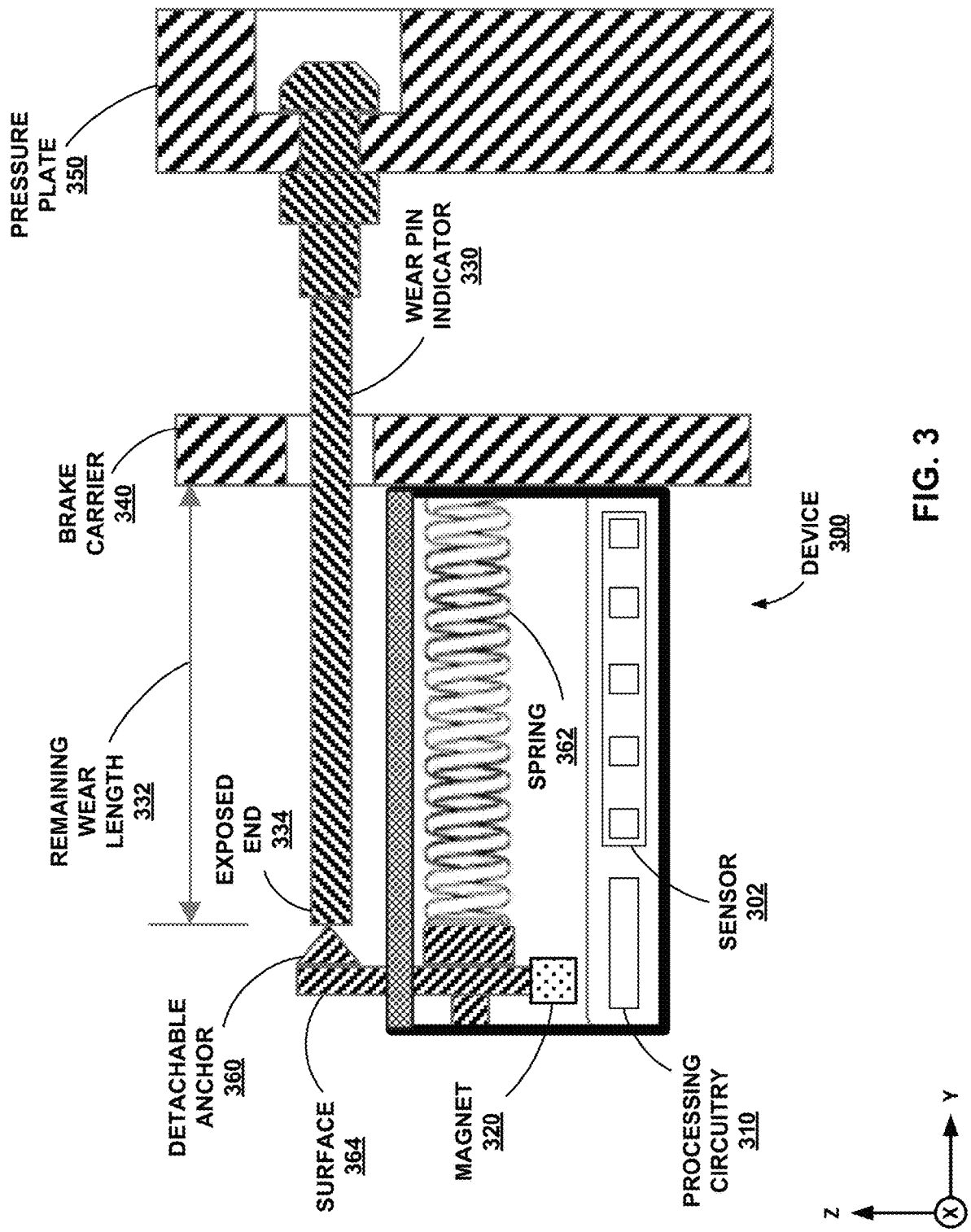
FIG. 3 is a diagram depicting a device for measuring the length of a wear pin indicator with a sensor, in accordance with some examples of this disclosure.
Figure 4:
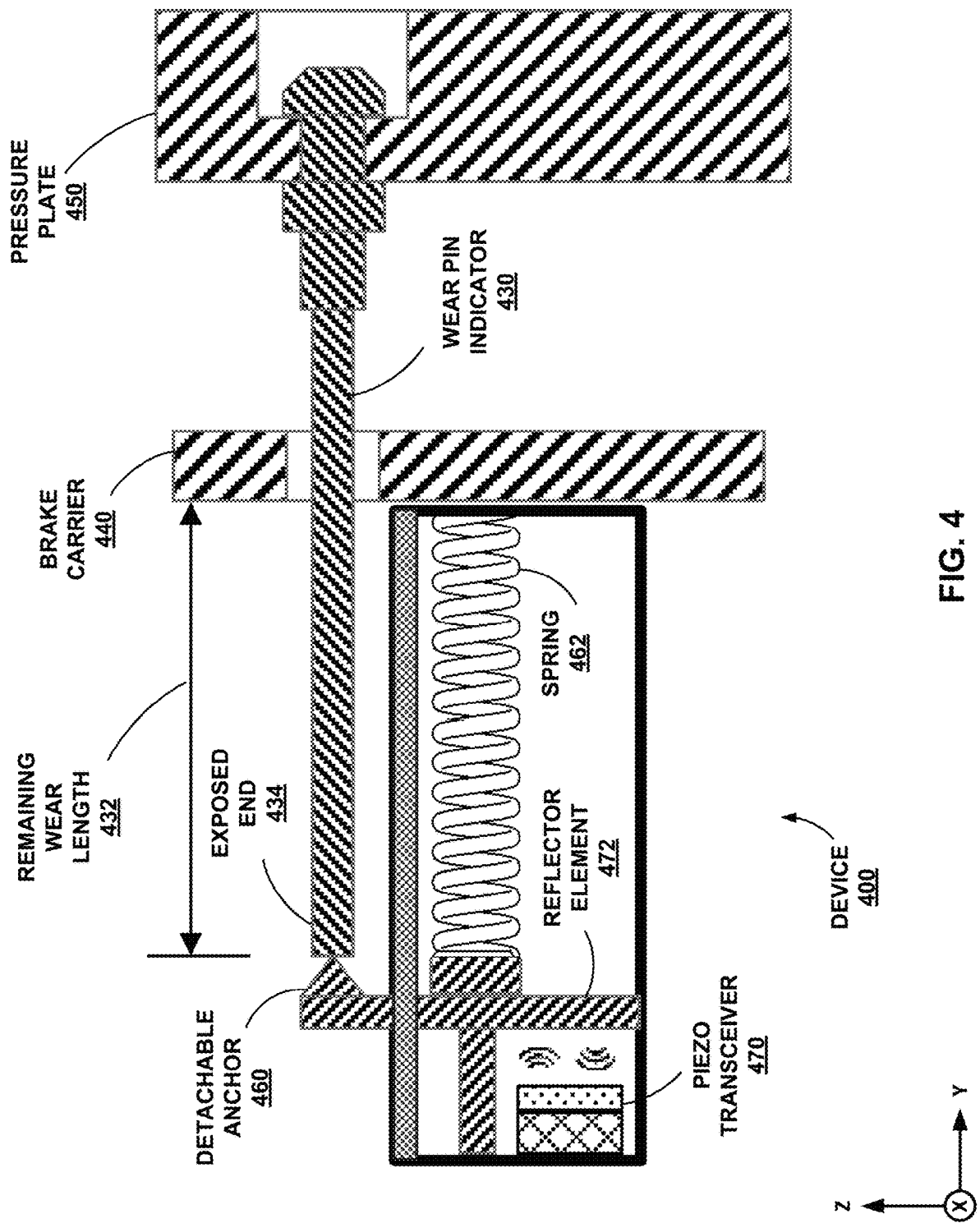
Figure 5:
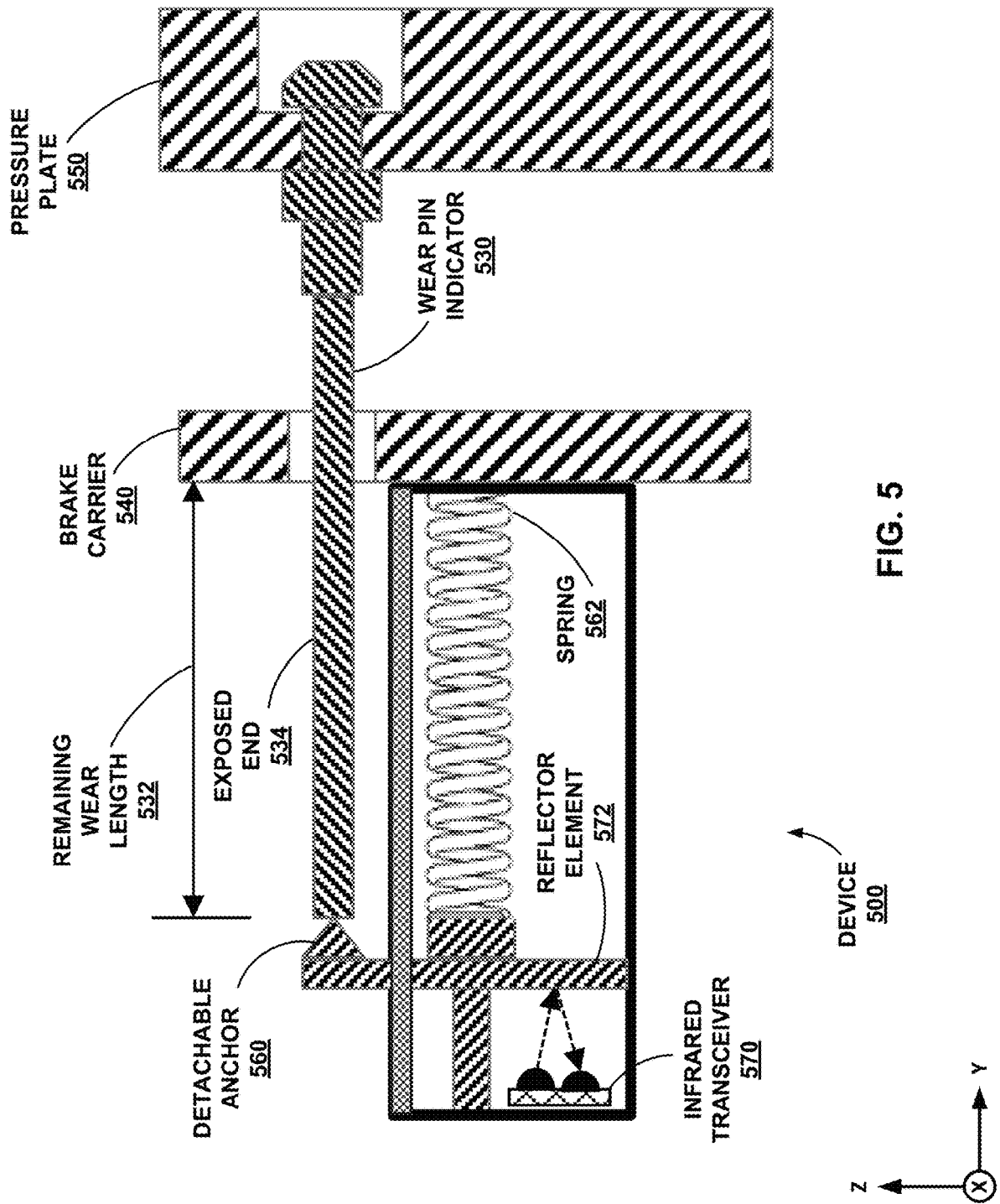

Each of devices 100, 200, and 300 includes a respective one of sensors 102, 202, and 302 configured to generate output signals based on the position of a respective one of magnets 120, 220, and 320. Each of devices 100, 200, and 300 also includes a respective one of processing circuitry 110, 210, and 310 configured to determine an estimated remaining use of a brake assembly. The techniques and elements shown in FIGS. 1A, 2, and 3 are not mutually exclusive and may be used in any combination. Transceivers 470, 570, and 670 shown in FIGS. 4-6A may be configured to transmit a measurement signal towards reflector element 472, 572, or 672 and receive a reflection of the measurement signal. The techniques and elements shown in FIGS. 4-6A may also be used in any combination with the techniques and elements shown in FIGS. 1A, 2, and 3. Thus, a device of this disclosure may use a hybrid of magnetic elements, as shown in FIGS. 1A, 2, and 3, along with ultrasonic, piezoelectric, and/or infrared elements, as shown in FIGS. 4-6A.

Device 100 may be attached to brake carrier 140 by mounting, gluing, taping, soldering, and/or any other attaching technique. In some examples, device 100 is attached to brake carrier 140 such that device 100 does not move. Therefore, as the length of wear pin indicator 130 decreases, output signal 106 changes based on the position of magnet 120 relative to each sensor of array of sensor elements 104. Output signal 106 may indicate a reduction in the length of wear pin indicator 130, which indicates the remaining use of brake carrier 140.

Sensor 102 includes array of sensor elements 104, where each of the sensor elements may be configured to generate an output signal based on the position of magnet 120. Sensors 202, 302, and 902 are examples of sensor 102. In some examples, sensor 102 could include a single sensor element or any other number of sensor elements. Each sensor element in array 104 may be spaced apart or separated from an adjacent sensor by an air gap or another dielectric material. This dielectric material may include an encapsulation material, a potting compound, or a room temperature vulcanizing (RTV) rubber sealant. Each of the sensor elements may be spaced center-on-center by five millimeters, ten millimeters, or any other suitable spacing. For example, if array 104 has eight sensor elements, sensor 102 may be 75 millimeters or three inches wide. Each of the sensor elements may be mounted on a printed circuit board inside of a housing or carrier.

In some examples, the output signal of each sensor element of array 104 may be inversely proportional to the distance between the respective sensor element and magnet 120. Sensor 102 may include a magnetoresistive sensor such as an anisotropic magnetoresistive (AMR) sensor or a giant magnetoresistive sensor, a Hall sensor, and/or any other type of sensor.

Output signal 106 may also be based on the position of magnet 120, or more specifically, by the direction of the portion of the magnetic field generated by magnet 120 that is passing through sensor 102 (e.g., through each element of array 104) at that position. Because the magnetic field lines are curved, the direction of the field passing through sensor 102 will change as magnet 120 moves along the y-axis, thereby varying output signal 106. For example, as magnet 120 approaches sensor 102 from the negative y-axis, the magnetic field passing through the sensor will gradually rotate from the positive z-axis, to the negative y-axis, to the negative z-axis. This rotation will trigger output signal 106 to have a positive value, a minimum negative value, and then approach zero value, respectively. Once magnet 120 is directly underneath a sensor element of array 104 (in the negative z-axis direction relative to sensor 102), the sensor element will be situated directly between the symmetrical magnetic fields extending from either side of magnet 120, and output signal 106 will register zero value. As magnet 120 further progresses along the y-axis, the opposite magnetic field will trigger output signal 106, moving from zero value to a maximum positive value, and then regressing back toward a negative value.

Processing circuitry 110 is configured to determine an estimated remaining use of the brake assembly, which includes wear pin indicator 130, brake carrier 140, and pressure plate 150, as well as other components not shown in FIG. 1A. Processing circuitry 110 may be configured to determine the estimated remaining use based directly on output signal 106, or processing circuitry 110 may first determine the length of wear pin indicator 130. Processing circuitry 110 can determine the length of wear pin indicator 130 based on output signal 106 and determine the remaining use of the brake assembly based on the length of wear pin indicator 130. Processing circuitry 110 may divide the length by an estimate of the wear (e.g., reduction in length) per braking event to determine the remaining use. Processing circuitry 110 can use the specifications for the brake assembly to determine the estimate of wear per braking event (e.g., rate of wear). Alternatively or additionally, processing circuitry 110 can use measurements of the length of wear pin indicator 130, along with the number of braking events between measurements, to determine the estimate of wear per braking event.

Processing circuitry 110 may be configured to determine the position of magnet 120 based on output signal 106, which may include a plurality of output signals generated by array of sensor elements 104. For example, if array 104 includes five sensor elements, each sensor can generate an output signal. Processing circuitry 110 may receive the five output signals and determine the position of magnet 120 relative to sensor 102 based on the five output signals. If magnet 120 is closer to a first sensor element than a second sensor element, the first sensor element may generate a stronger output signal than the first sensor element depending on the orientation of the positive pole and the negative pole of magnet 120.

Using output signal 106, processing circuitry 110 may be configured to determine the remaining length of wear pin indicator 130 by, for example, comparing the current distance measurement to an initial or previous distance or length. Processing circuitry 110 may be configured to determine the position of magnet 120 and then determine the length of wear pin indicator 130 based on the position of magnet 120 relative to sensor 102 and the position of magnet 120 relative to wear pin indicator 130. Processing circuitry 110 may also be configured to transmit the determined current length of wear pin indicator 130, along with a timestamp indicative of the time at which the length was measured, to be stored within a memory device of device 100.

Processing circuitry 110 may further be configured to retrieve from the memory device a previous set of wear pin indicator length and time data and use the data in conjunction with a current measurement in order to determine a rate of change of the length of wear pin indicator 130 during the time between which the different measurements were conducted. Processing circuitry 110 may then transmit the rate of change data to be stored in the memory device along with the length and time data. Processing circuitry 110 may determine if the length of the wear pin indicator is less than a threshold length and generate an alert in response to determining that the length of the wear pin indicator is less than the threshold length. Such an alert may be an audio alert, such as a recorded verbal message or a tone, or alternatively or additionally, a visual alert, such as a displayed phrase, message, symbol, or color.

In some examples, processing circuitry 110 may perform data analysis on the data indicating the length of wear pin indicator 130. For example, processing circuitry 110 may use data indicating the number of braking events, the weather conditions during each braking event, the vehicle operator during each braking event, the type of surface for each braking event (asphalt, concrete, etc.), and/or any other data stored to the memory device. Processing circuitry 110 may determine metrics such as the rate of wear and the estimated remaining use of wear pin indicator 130. Processing circuitry 110 may also determine when and whether to generate alerts regarding the status of wear pin indicator 130 and/or the brake assembly. Alternatively or additionally, processing circuitry 110 may output the data to an external computing system, such as the avionics bay of an aircraft, to perform the data analysis on data relating to wear pin indicator 130 and/or the brake assembly.

Although not shown in FIG. 1A, the memory device of device 100 is a non-transitory computer-readable medium capable of storing information indicative of the length of wear pin indicator 130 along with a timestamp indicating the time at which the measurement was made. The memory device may be further configured to store multiple sets of length and time data, as well as rates of change of the length of wear pin indicator 130 between subsequent measurements. The memory device may also store threshold lengths and threshold distances that processing circuitry 110 may use to determine if wear pin indicator 130 is approaching an end of useful life. In some examples, the memory device stores data relating to braking events, such as a measurement conducted when the brakes are applied, and weather or climate conditions.

Processing circuitry 110 may be configured to determine the estimated remaining use of the brake assembly directly based on output signal 106, for example, based on a mapping of signal characteristics to remaining-use estimates stored to a memory device. The mapping may take the form a data structure such as an array or a lookup table that associates estimated remaining uses with signal characteristics, such as strength, amplitude, power, direction, etc. Processing circuitry 110 may use the mapping stored to a memory device to directly determine the estimated remaining use of the brake assembly, or processing circuitry 110 may first determine the position of magnet 120 (e.g., absolute position or position relative to sensor 102). Processing circuitry 110 may be configured to update the mapping stored to the memory device by storing each instance of output signal 106 (e.g., each sampling of output signal 106) and the new estimated remaining use of the brake assembly to the memory device.

Device 100 may also include a communication element (see, e.g., communication element 930 shown in FIG. 9) configured to transmit data to an external computing system. The communication element may transmit data through a wired connection or a wireless connection to the external computing system. The transmitted data may indicate the estimated remaining use of the brake assembly, the length of the wear, the rate of change of the length of the wear pin indicator, and/or any other relevant data.

Magnet 120 is shown in FIG. 1A as coupled to or attached to exposed end 134 of wear pin indicator 130. Magnet 120 is configured to move laterally (e.g., in the y-axis direction) in response to movement of wear pin indicator 130. The position of magnet 120 indicates remaining wear length 132 of wear pin indicator 130. Magnet 120 may be attached to wear pin indicator 130 by mounting, screwing, welding, gluing, taping, soldering, and/or any other attaching technique. Magnet 120 may include magnetic material such as iron, cobalt, nickel, aluminum, alnico, and/or any other magnetic materials.

Magnet 120 is configured to generate a magnetic field, as shown by the example magnetic field lines in FIG. 1A. Magnet 120 may include a positive pole and a negative pole oriented along a line in the z-axis direction, such that one pole is closer to array of sensor elements 104 than the other pole. Thus, as magnet 120 moves past sensor 102, output signal 106 will vary as a function of the direction of the magnetic field passing through the sensor at that position. Since the magnetic fields form a symmetrical arc on either side of magnet 120, output signal 106 may form a sinusoid as magnet 120 gradually moves past sensor 102, as shown in graph 170B of FIG. 1B.

Wear pin indicator 130 is a component whose exposed length represents the remaining use (e.g., remaining lifespan) of the brake assembly of a vehicle. In some examples, when the tip of wear pin indicator 130 is flush with brake carrier 140, the vehicle's brakes may need replacement due to excessive wear. Wear pin indicator 130 may have any suitable shape, such as a cylinder, a cone, or a rectangle, where the length of wear pin indicator 130 may decrease over time. As a cylinder, wear pin indicator 130 may have a radius of a few millimeters. Wear pin indicator 130 can also include a material layer, a coating, and/or a covering that indicates the wear of the brake assembly.

The brake assembly may include braking elements for slowing the speed of rotation of vehicle wheels, such as automobile wheels or aircraft landing gear. The brake assembly may be mounted to or built in to the wheels. Device 100 may be mounted to a part of the brake assembly, such as brake carrier 140. The brake assembly may also be referred to herein as a "braking assembly" or as a "braking system." As used herein, the term "the remaining use of the brake assembly" may refer to the remaining use of the brake lining.

Wear pin indicator 130 is mounted on pressure plate 150 (e.g., by a rivet), which holds the brake lining on the other side of pressure plate 150. Pressure plate 150 may include metal material. Brake carriers 240, 340, 440, 540, and 740 are examples of brake carrier 140, and pressure plates 250, 350, 450, 550, and 750 shown in FIG. 3 are examples of pressure plate 150. Pressure plate 150 can be attached to one or more pads of the brake lining (e.g., a brake shoe a brake pad) that may include steel or carbon. Pressure plate 150 is configured to move with respect to brake carrier 140 as the vehicle's brakes wear down through use over time.

The brake lining may press against a rotating component of a wheel to reduce the speed of the rotating component. When the brakes are applied during a braking event, a stationary hydraulic system can push or displace pressure plate 150 against the brake lining thereby generating friction between the stationary pads of the brake lining and the rotating component, such as a wheel disc. The friction between the pads of the brake lining and the rotating component causes the rotation of the wheel to decline. The brake lining may be the active portion of braking assembly that wears down over time due to braking events.

Because wear pin indicator 130 is physically coupled to pressure plate 150, wear pin indicator 130 likewise moves with respect to brake carrier 140, and with respect to sensor 102. In the example of FIG. 1A, wear pin indicator 130 is attached to pressure plate 150 and protrudes through brake carrier 140. Because wear pin indicator 130 moves with respect to brake carrier 140, the exposed portion of wear pin indicator 130, or remaining wear length 132, decreases with use of the brakes. As remaining wear length 132 approaches zero, and the tip or surface of wear pin indicator 130 approaches the surface of brake carrier 140, the brakes may be nearing the time at which they need to be replaced. When the surface of wear pin indicator 130 is flush with the surface of brake carrier 140, the lifespan of the vehicle's brakes may be presumed to be over, or may be considered dangerous to continue using, as this may result in brake failure.

For example, if the original length of wear pin indicator 130 is one inch (e.g., approximately twenty-five millimeters), and the part supplier states that the new brake lining can perform for one thousand braking events, processing circuitry 110 determines that the wear per braking event is 0.001 inches or 0.025 millimeters. If processing circuitry 110 later determines that a new length of wear pin indicator 130 is ten millimeters less than the original, the processing circuitry may determine that the new length is fifteen millimeters. Using a rate of wear of 0.025 millimeters per braking event and Equation (3), processing circuitry 110 determines that the remaining use of the brake lining is six hundred braking events.

Additional example details of detecting brake wear may be found in commonly assigned U.S. patent application Ser. No. 15/964,279, filed on Apr. 27, 2018, entitled "Determining Estimated Remaining Use of Brake Assembly by Transceiver," commonly assigned U.S. Pat. No. 9,482,301 issued on Nov. 1, 2016, entitled "Brake Disc Stack Wear Measurement," and commonly assigned U.S. Pat. No. 9,441,92 issued on Sep. 13, 2016, entitled "Proximity Sensor for Brake Wear Detection," which are incorporated herein by reference in their entirety.

In accordance with the techniques of this disclosure, processing circuitry 110 may determine the estimated remaining use of the brake assembly based on output signal 106, which may indicate the position of magnet 120 relative to sensor 102. Device 100 may perform a measurement of the estimated remaining use of the brake assembly automatically (e.g., without a human operator). For example, a measurement of the estimated remaining use of the brake assembly may occur when the brakes are applied. Processing circuitry 110 may be configured to determine when the brakes are applied and to sample, without human intervention, output signal 106 when the brakes are applied.

The techniques of this disclosure may be especially useful for after-market devices that can be installed on existing brake assemblies. An after-market device may be installed on a brake carrier 140 such that device 100 does not contact wear pin indicator 130.

Figure 1B:
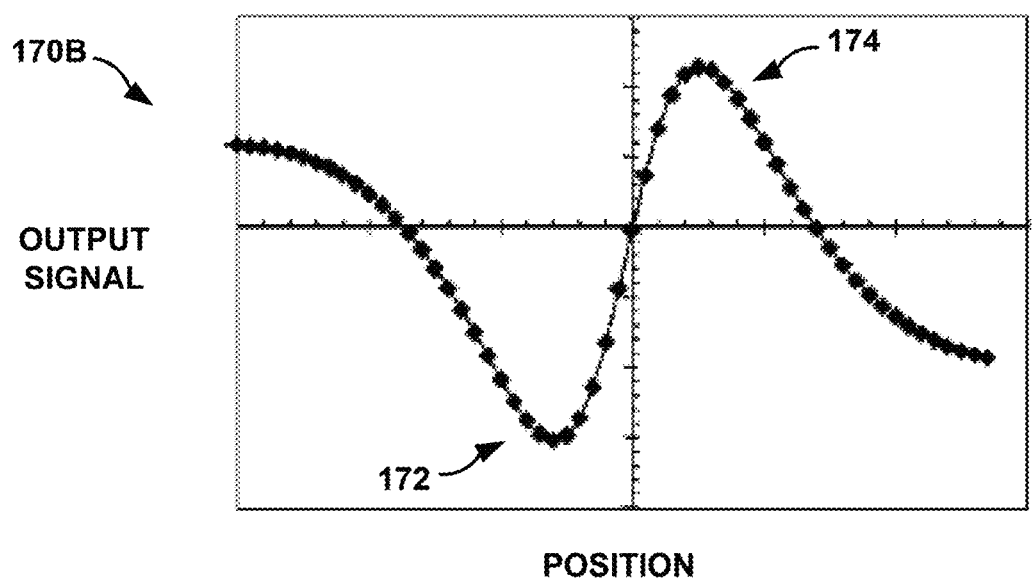
FIGS. 1B-1D are graphs of output signals, position of a magnet, and lengths of a wear pin indicator, in accordance with some examples of this disclosure.
Figure 1C:
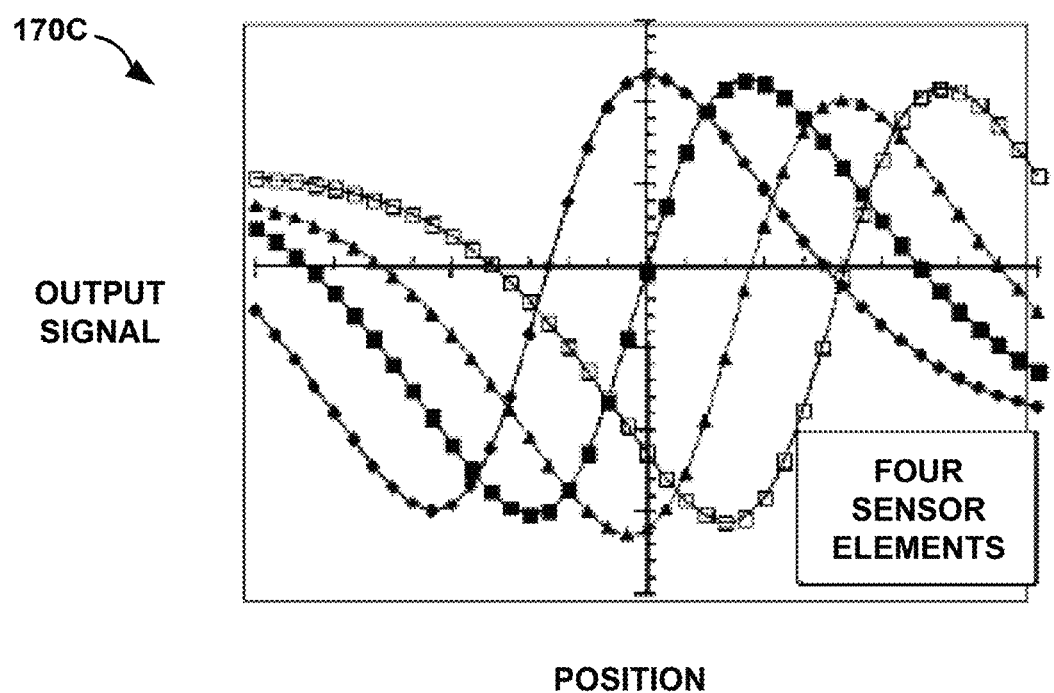
Figure 1D:
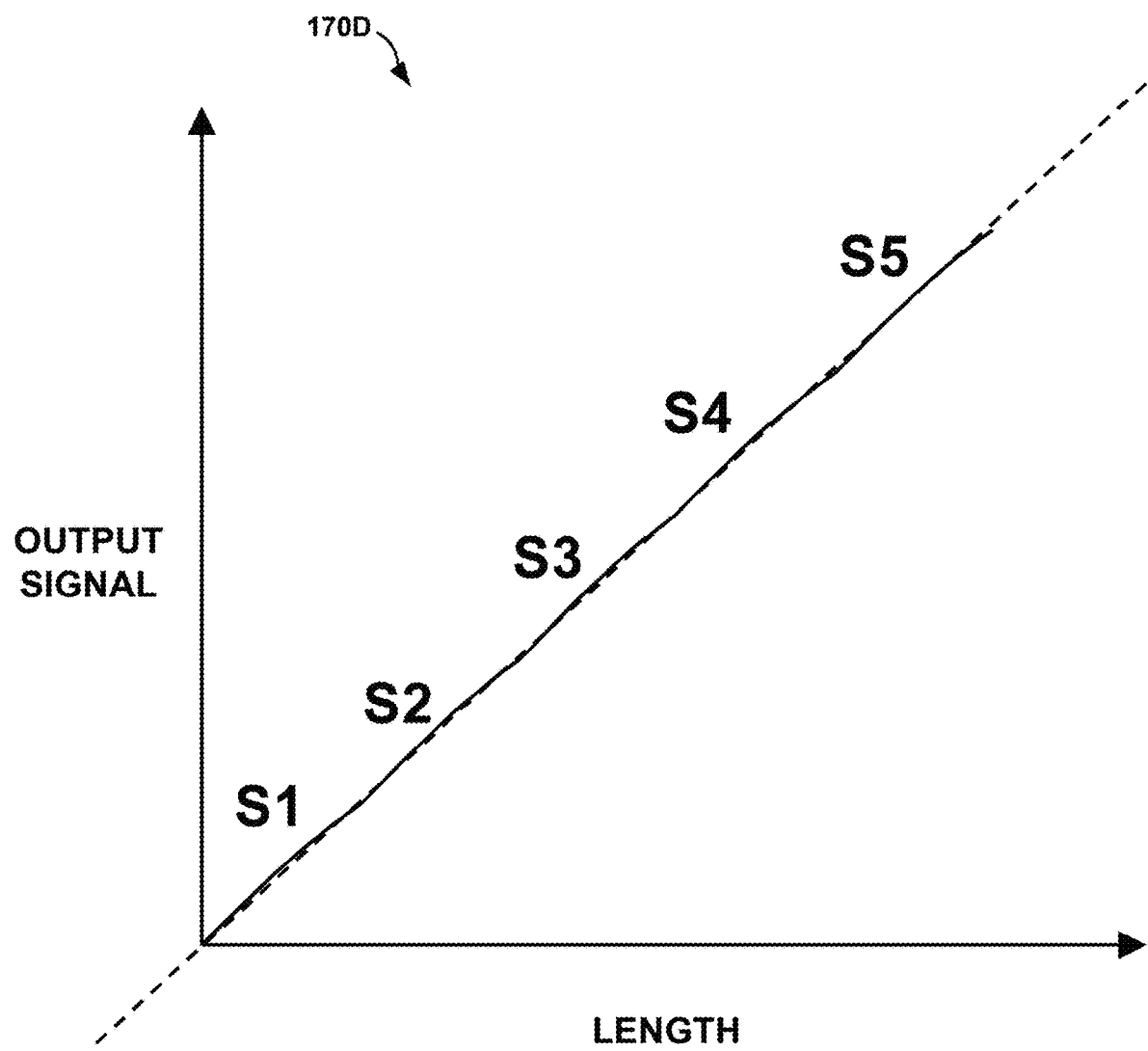

FIGS. 1B-1D are graphs 170B-170D of output signals, position of a magnet, and lengths of a wear pin indicator, in accordance with some examples of this disclosure. For example, graph 170B shows the output signal from a single sensor element. The amplitude of the output signal is a function of the direction of the magnetic field lines passing through the sensor element for any given position of the magnet generating the field. As a magnet approaches the sensor element, the amplitude of the output signal decreases to minimum 172 at the "top" of the field on a first side of the magnet. As the magnet moves past the sensor element, the amplitude of the output signal increases to maximum 174 at the "top" of the magnetic field on the opposite side of the magnet, before decreasing again.

Graph 170C shows output signals that are similar to the output signal shown in graph 170B. However, graph 170C shows four output signals from an array of four sensor elements. Depending on the layout of the sensor elements, the magnet may move past each sensor element at a different time, such that the minimums and maximums of the output signals are not necessarily occurring at the same times. Graph 170D shows a composite output signal for an array of five sensor elements (S1-S5). The output signal shown in graph 170D may have a generally linear relationship with the length of a wear pin indicator but may stray from an ideal linear relationship as the magnet passes each sensor element. Processing circuitry may be configured to determine an estimated remaining use of a brake assembly based on the output signal shown in graph 170D.

FIG. 2 is a diagram depicting a device 200 for measuring the length of a wear pin indicator 230 with a sensor 202, in accordance with some examples of this disclosure. Device 200 includes sensor 202, processing circuitry 210, magnet 220, detachable anchor 260, spring 262, surface 264, and piston 266. Sensor 202 and processing circuitry 210 may operate in the same manner or a similar manner to sensor 102 and processing circuitry 110 shown in FIG. 1A.

Detachable anchor 260 is coupled to exposed end 234 of wear pin indicator 230 and configured to move laterally (e.g., in the y-axis direction) in response to movement of wear pin indicator 230. Detachable anchor 260 is depicted as a pointer tip or a triangle in FIG. 2, but detachable anchor 260 may include any material suitable for attaching an end of spring 262 to wear pin indicator 230. Detachable anchor 260 may be attached to wear pin indicator 230 by mounting, gluing, taping, soldering, and/or any other attaching technique.

Spring 262 is configured to expand or compress in response to movement of wear pin indicator 230. A first end of spring 262 is coupled to detachable anchor 260 and configured to move laterally in response to movement of wear pin indicator 230. A second end of spring 262 is coupled to surface 264 and does not move in response to movement of wear pin indicator 230. Surface 264 may be configured to not move as wear pin indicator 230 moves. Over time, as exposed end 234 moves towards pressure plate 250, spring 262 will expand as the first end moves towards pressure plate 250 and the second end does not move.

Piston 266 is an example of a mounting element coupled to an end of spring 262 and configured to move laterally in response to movement of wear pin indicator 230. A first end of piston 266 may be coupled to detachable anchor 260 and to the first end of spring 262. The first end of piston 266 and a portion of piston 266 is not shown in FIG. 2 because piston 266 is loaded inside of spring 262. Piston 266 may pass through surface 264. Magnet 220 is coupled to a second end of piston 266 by mounting, gluing, taping, soldering, and/or any other attaching technique.

FIG. 3 is a diagram depicting a device 300 for measuring the length of a wear pin indicator 330 with a sensor 302, in accordance with some examples of this disclosure. Device 300 includes sensor 302, processing circuitry 310, magnet 320, detachable anchor 360, spring 362, and surface 364. Sensor 302 and processing circuitry 310 may operate in the same manner or a similar manner to sensors 102 and 202 and processing circuitry 110 and 210 shown in FIGS. 1A and 2.

Detachable anchor 360 is coupled to exposed end 334 of wear pin indicator 330. Surface 364 is coupled to detachable anchor 360. Detachable anchor 360 and surface 364 are configured to move laterally (e.g., in the y-axis direction) in response to movement of wear pin indicator 330. Detachable anchor 360 is depicted as a pointer tip or a triangle in FIG. 3, but detachable anchor 360 may include any material suitable for attaching an end of spring 362 to wear pin indicator 330. The attachments between elements shown in FIG. 3 may include mounting, gluing, taping, soldering, and/or any other attaching technique.

Spring 362 is configured to expand or compress in response to movement of wear pin indicator 330. A first end of spring 362 is coupled to surface 364 and configured to move laterally in response to movement of wear pin indicator 330. A second end of spring 362 is coupled to brake carrier 340 and does not move in response to movement of wear pin indicator 330. Over time, as exposed end 334 moves towards pressure plate 350, spring 362 will compress as the first end moves towards brake carrier 340 and the second end does not move. Therefore, spring 362 is configured to hold surface 364 in contact with exposed end 334. In some examples, surface 364 may be attached to exposed end 334 such that spring 362 is not necessary. Similarly, springs 462, 562, and 662 may not be necessary. Magnet 320 may be configured to move in response to the movement of wear pin indicator 330 and with surface 364.

FIGS. 4-6A are diagram depicting devices 400, 500, and 600 for measuring the length of a wear pin indicator 430, 530, or 630 with a transceiver 470, 570, or 670, in accordance with some examples of this disclosure. Each of devices 400, 500, and 600 includes detachable anchor 460, 560, or 660, spring 462, 562, or 662, transceiver 470, 570, or 670, and reflector element 472, 572, or 672. Detachable anchors 460, 560, or 660 and springs 462, 562, or 662 may operate in the same manner or a similar manner to detachable anchor 360 and spring 362 shown in FIG. 3. Reflector elements 472, 572, and 672 may operate in the same manner or a similar manner to surface 364 shown in FIG. 3 in that reflector elements 472, 572, and 672 is coupled to and configured to move in response to movement of wear pin indicator 430, 530, or 630, detachable anchor 460, 560, or 660, and a first end of spring 462, 562, or 662. Reflector elements 472, 572, and 672 may be coupled to exposed ends 434, 534, and 634.

Transceivers 470, 570, and 670 may be configured to transmit a measurement signal towards a surface of reflector element 472, 572, or 672 at a first time. Transceivers 470, 570, and 670 may be further configured to receive a reflection of the measurement signal from the surface of reflector element 472, 572, or 672 at a second time. Processing circuitry of device 400, 500, or 600 may be configured to determine an estimated remaining use of the brake assembly based on the reflection of the measurement signal received by transceiver 470, 570, or 670.

Piezo transceiver 470 may be configured to generate an electrical signal in response to the movement of reflector element 472. In some examples, movement of reflector element 472 may cause an increase or a decrease in pressure on piezo transceiver 470. The change in pressure on piezo transceiver 470 may result in a change in the electric signal generated by piezo transceiver 470. Pulses to a piezoelectric sensor can generate acoustic waves, where the piezoelectric sensor can be used as an actuator and a sensor. The temperature of the steel or another material may affect the velocity of the waves transmitted through the material. Infrared transceiver 570 may be configured to transmit an infrared measurement signal towards reflector element 572. Ultrasonic transceiver 670 may be configured to transmit sonic wave 614 and receive reflected sonic wave 616.

Transceivers 470, 570, and 670 include both transmitting and receiving capabilities and can be directed toward reflector element 472, 572, or 672. The transmitting components of transceivers 470, 570, and 670 are capable of emitting a measurement signal, and the receiving components of transceivers 470, 570, and 670 are capable of sensing or detecting a reflected signal returning from reflector element 472, 572, or 672.

A device of this disclosure may include a timer configured to generate a first timestamp indicative of the time at which transceiver 470, 570, or 670 emitted a measurement signal. The timer may be further configured to generate a second timestamp indicative of the time at which transceiver 470, 570, or 670 received the reflected measurement signal. In some examples, the timer may include a counter configured to increment a number stored to a register based on a clock signal. Processing circuitry may be configured to reset the timer at the time that transceiver 470, 570, or 670 transmits a measurement signal towards a reflector element. Processing circuitry may check the timer value when transceiver 470, 570, or 670 receives a reflected measurement signal to determine the time at which the reflected signal is received.

The processing circuitry may be further configured to determine a difference in time between the first timestamp, indicative of the transmitted measurement signal, and the second timestamp, indicative of the reflected measurement signal, and to use this time difference along with a known signal velocity to determine the distance travelled by the transmitted measurement signal. The distance travelled by the measurement signal may be equal to the distance between transceiver 470, 570, or 670 and reflector element 472, 572, or 672. The processing circuitry may be configured to use this distance to determine the length of the wear pin indicator and/or an estimated remaining use of a brake assembly.

The following description of Equations (1)-(3) applies to devices 400 and 500, as well as device 600. Transceiver 670 is configured to transmit sonic wave 614 at a first time toward reflector element 672. Sonic wave 614 reflects off reflector element 672 and becomes reflected sonic wave 616. Transceiver 670 may be configured to receive or detect reflected sonic wave 616 at a second time. In some examples, microcontroller 610 may then be configured to determine the distance between transceiver 670 and reflector element 672, which is equivalent to the distance travelled by sonic wave 614, which is also equivalent to the distance travelled by reflected sonic wave 616. This measurement may be determined by the relation $$d_1 = v * \left(\frac{t_2 - t_1}{2}\right) \qquad (1)$$

where:
$d_1$ is the distance between transceiver 670 and reflector element 672;
v is the known velocity of sonic waves 614 and 616, for example, the speed of light, c;
$t_2$ is the time at which sonic wave 616 was received by transceiver 670; and
$t_1$ is the time at which sonic wave 614 was transmitted by transceiver 670.

From here, remaining wear length 632 may be determined by the relation shown in Equation (2).

$$L = d_2 - d_1 - d_3 \qquad (2)$$

where:
L is remaining wear length 632;
$d_2$ is the known distance between transceiver 670 and the brake carrier;
$d_1$ is the previously determined distance (see Equation (1)) between transceiver 670 and the reflector element 672; and
$d_3$ is length 676 of detachable anchor 660 and reflector element 672.

Over time, the tip of wear pin indicator 630 moves in the positive y-axis direction towards the edge of the brake carrier. As wear pin indicator 630 moves, distance length 674 increases, and remaining wear length 632 decreases. Device 600 may be configured to store a threshold length for wear pin indicator 630, where the threshold length may indicate remaining wear length 632 when the brakes should be replaced. As an alternative or additional technique, device 600 may determine the remaining use of the brake assembly directly from the time difference of sonic waves 614 and 616.

$$\text{Number of remaining braking events} = L/(\text{Wear per braking event}) \quad (3)$$

$$\text{Wear per braking event} = L_{original}/(\text{Original number of braking event}) \quad (4)$$

Using Equation (3), the processing circuitry may be configured to then determine an estimate of the number of remaining braking events (e.g., landings) that can occur with optimal braking before replacing the brake lining. Microcontroller 610 can determine the number of remaining braking events by dividing the remaining wear length 632 (L) by the wear per braking event (e.g., rate of wear). The processing circuitry can determine the wear per braking event by dividing the original length ($L_{original}$) of wear pin indicator 630 by the original number of braking events specified by the part supplier, using Equation (4).

Figure 6A:
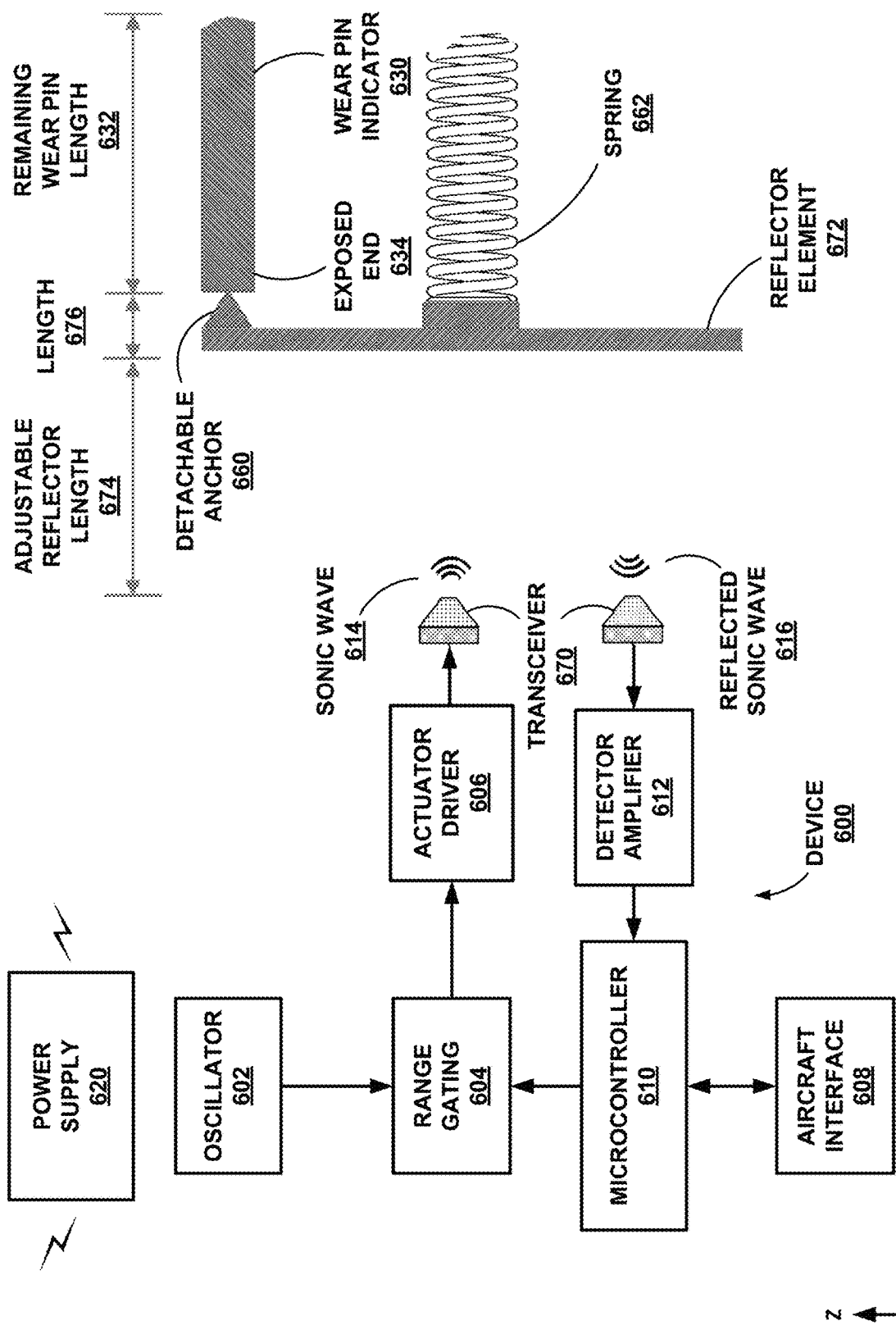

FIG. 6A shows additional detail for device 600 that may also apply to any of devices 100, 200, 300, 400, 500, 700, and 900. For example, microcontroller 610 may be configured to communicate with aircraft interface 608 to determine when the brakes are being applied. Microcontroller 610 may be configured to transmit data regarding remaining length 632 and the estimated remaining use of the brake assembly to aircraft interface 608. Microcontroller 610 may be configured to deliver a measurement signal to range gating 604, which can control the timing of the transmission of sonic wave 614.

Device 600 can use a clock signal produced by oscillator 602 to generate sonic wave 614. Actuator driver 606 may be configured to generate sonic wave 614 for transmission by transceiver 670. Detector amplifier 612 may be configured to amplify reflected sonic wave 616 received by transceiver 670. Power supply 620 can deliver electrical power to elements 602, 604, 606, 610, and 612 of device 600.

Figure 6B:
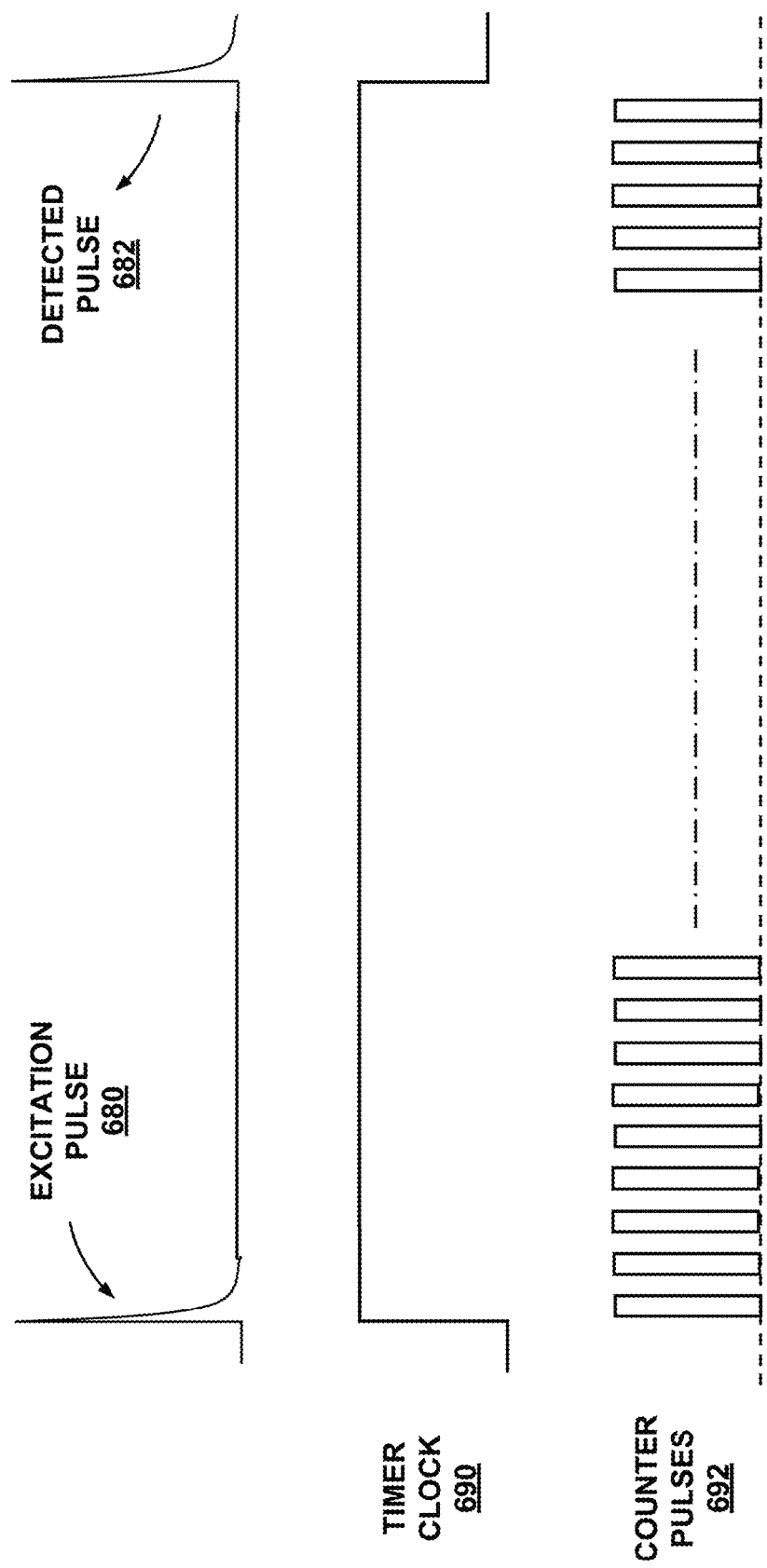
FIG. 6B is a timing diagram of a measurement signal, a timer clock, and counter pulses, in accordance with some examples of this disclosure.

FIG. 6B is a timing diagram of a measurement signal, a timer clock 690, and counter pulses 692, in accordance with some examples of this disclosure. In the example of FIG. 6A, transceiver 670 transmits excitation pulse 680 at a first time, where sonic wave 614 is an example of excitation pulse 680. At a second time, transceiver 670 receives detected pulse 682, where reflected sonic wave 616 is an example of detected pulse 682.

Microcontroller 610 may be configured to start a counter at the first time and stop the counter at the second time. Each of counter pulses 692 may be based on a clock signal and/or an oscillator of microcontroller 610. Microcontroller 610 may be configured to count the number of pulses 692 to determine the time difference between the transmission of excitation pulse 680 and reception of detected pulse 682. Equation (5) shows an example of determining length 674 shown in FIG. 6A based on the velocity of sonic waves 614 and 616 ($C_L$) and the time difference ($t_{difference}$) between pulses 680 and 682.

$$\text{Length } 674 = C_L \times \frac{t_{difference}}{2} \quad (5)$$

Equation (6) shows an example of determining remaining length 632 of wear pin indicator 630. Lengths 674 and 676 are subtracted from the total length from transceiver 670 to the brake carrier. Length 676 may be a predetermined length across detachable anchor 660 and reflector element 672 that is stored to a memory of device 600.

$$\text{Length } 632 = \text{Length}_{total} - \text{Length } 674 - \text{Length } 676 \quad (2)$$

Figure 7A:
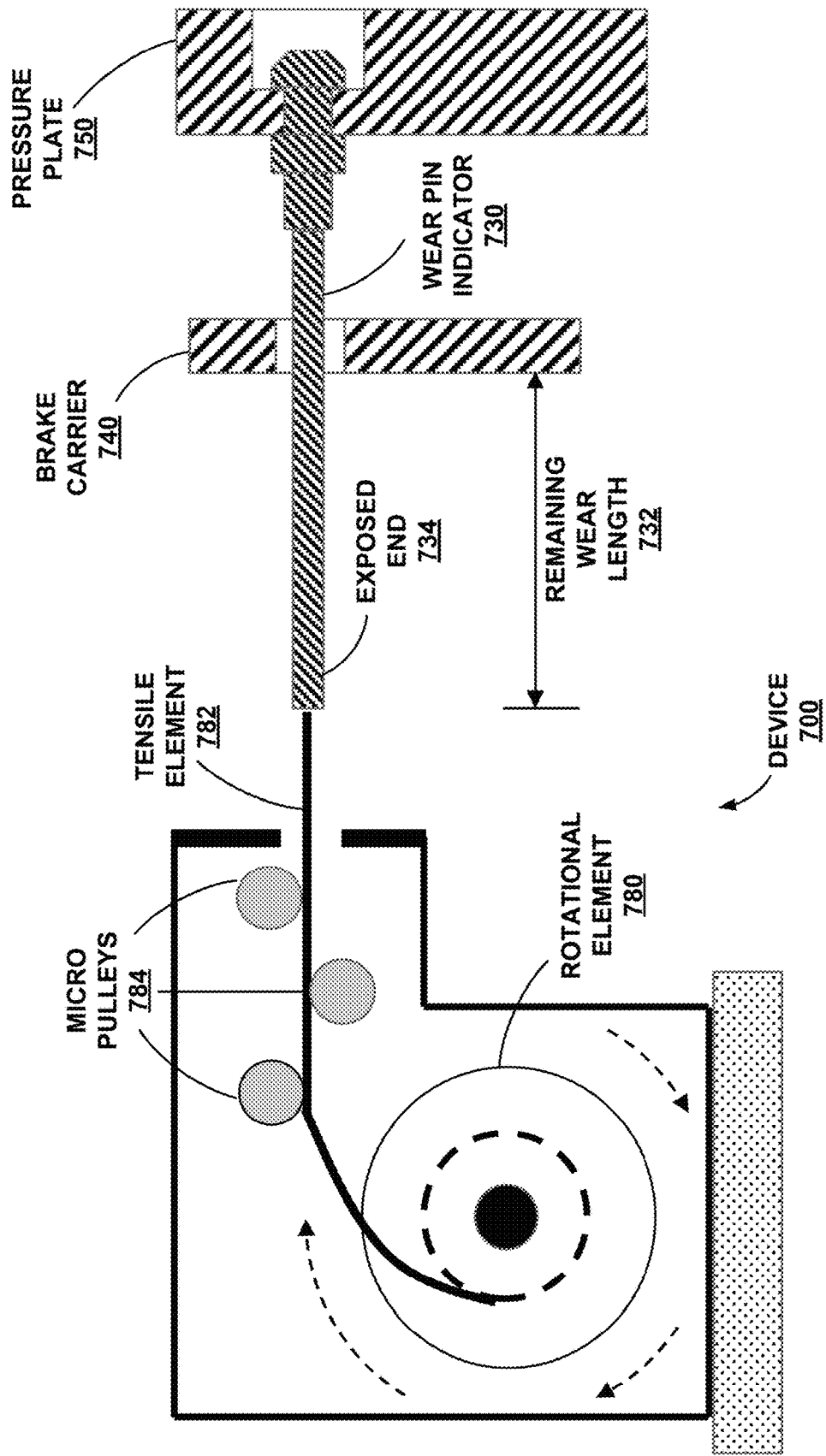
FIG. 7A is a diagram depicting a device with rotational element for measuring the length of a wear pin indicator with a rotary magnetic sensor, in accordance with some examples of this disclosure.

FIG. 7A is a diagram depicting a device 700 with rotational element 780 for measuring the length 732 of a wear pin indicator 730 with a rotary magnetic sensor 802, in accordance with some examples of this disclosure. Rotational element 780 is configured to rotate in response to lateral movement (e.g., in the y-axis direction) of wear pin indicator 730. As a result, lateral displacement of wear pin indicator 730 may result in angular displacement of rotational element 780. A first end of tensile element 782 may be coupled to exposed end 734 of wear pin indicator 730, and a second end of tensile element 782 may be wrapped around rotational element 780, causing rotational element 780 to rotate. When wear pin indicator 730 moves towards pressure plate 750, wear pin indicator 730 pulls tensile element 782, causing rotational element 780 to rotate. Micro pulleys 784 are optional elements that can cause tensile element 782 to stay in a specific path. Rotational element 780 may include a bobbin.

FIG. 7B is a diagram depicting a side view of device 700, in accordance with some examples of this disclosure. Magnet 720 is attached to rotational element 780 and configured to rotate when rotational element 780 rotates. Thus, magnet 720 may be configured to rotate in response to movement of wear pin indicator 730 shown in FIG. 7A. Magnet 720 may be positioned along axis of rotation 722 of rotational element 780. Axis of rotation 722 extends in the x-axis rotation.

Sensor 702 is configured to generate an output signal based on the magnetic field produced by magnet 720, which can change based on the orientation of magnet 720. FIG. 7B shows magnetic field lines for the magnetic field produced by magnet 720. Sensor 702 may be configured to generate the output signal based on an angle of magnet 720 relative to sensor 702.

Figure 8A:
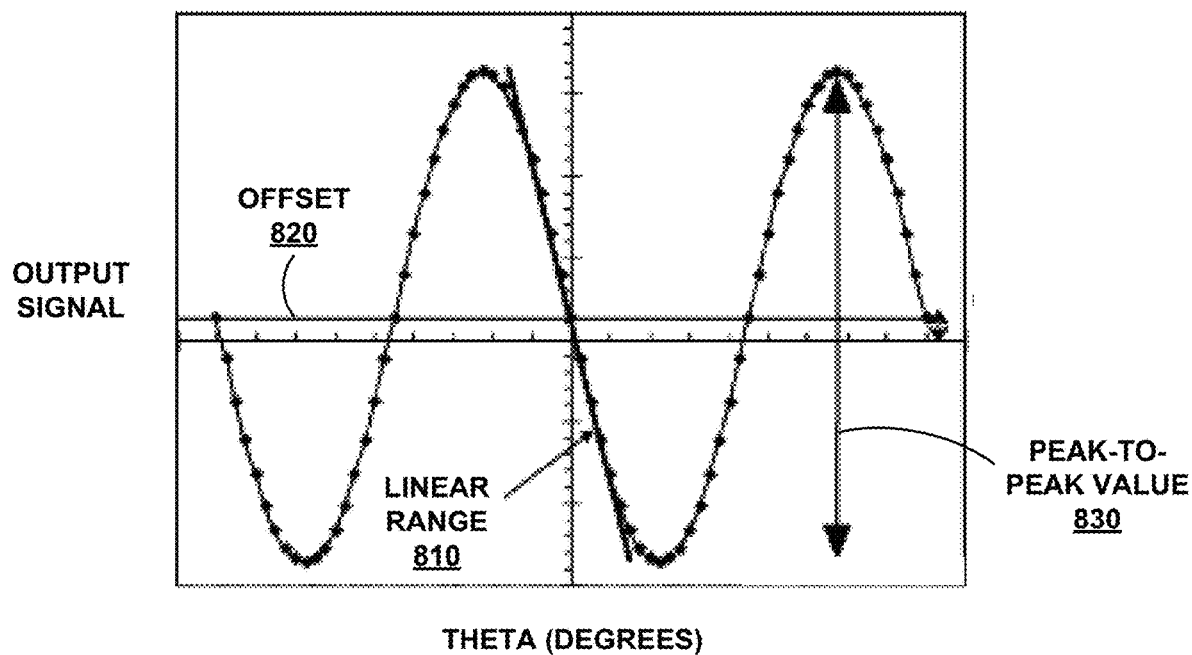
FIG. 8A is a graph of an output signal and rotational angle, in accordance with some examples of this disclosure.

FIG. 8A is a graph of an output signal and rotational angle, in accordance with some examples of this disclosure. The signal output varies as a function of the rotational angle of a magnet coupled to a rotational element. In linear range 810, the relationship between the signal output and rotational angle may be nearly linear. Offset 820 is the average signal amplitude, which can be nonzero due to a positional offset of the sensor, temperature effects, and/or a supply electrical current. This non-zero offset error may be corrected in the signal processing circuitry (e.g., processing circuitry 910 and/or signal conditioner 940 shown in FIG. 9). In the example of FIG. 8A, peak-to-peak value 830 is approximately 120 millivolts where the supply voltage is five volts.

Figure 8B:
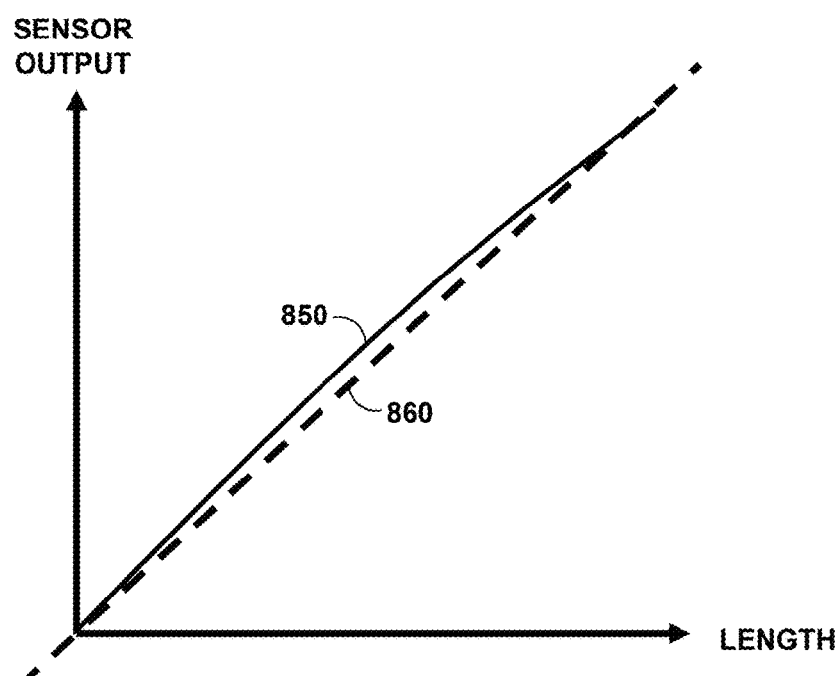
FIG. 8B is a graph of an output signal and length of a wear pin indicator, in accordance with some examples of this disclosure.

FIG. 8B is a graph of an output signal 850 and length of a wear pin indicator, in accordance with some examples of this disclosure. Output signal 850 has a nearly linear relationship with the length of the wear pin indicator. In the middle of the graph, the amplitude of output signal 850 strays from straight line 860. Processing circuitry may be configured to determine an estimated remaining use of a brake assembly based on output signal 850.

Figure 9:
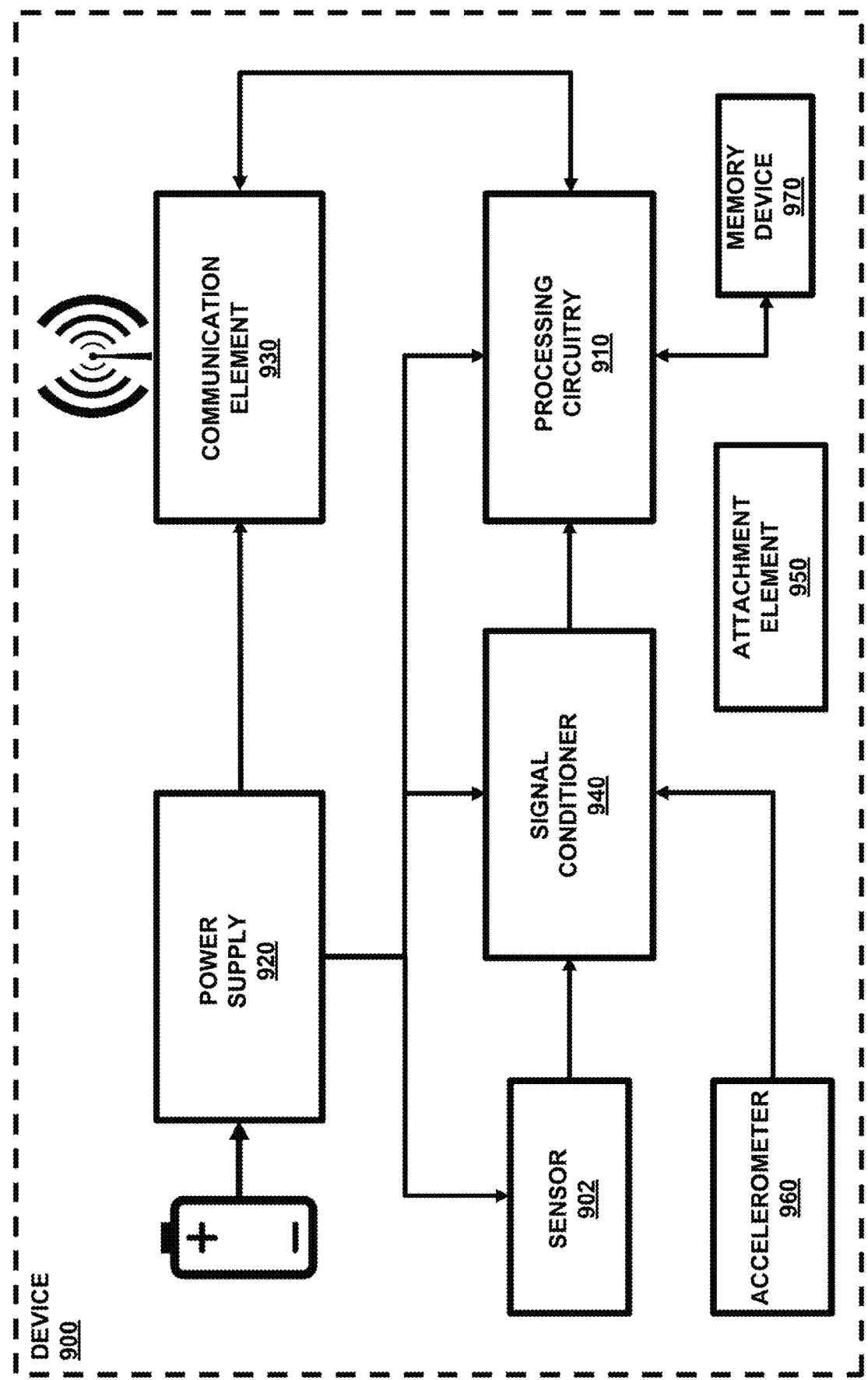
FIG. 9 is a conceptual block diagram illustrating a device for measuring the length of a wear pin indicator, in accordance with some examples of this disclosure.

FIG. 9 is a conceptual block diagram illustrating a device for measuring the length of a wear pin indicator, in accordance with some examples of this disclosure. Device 900 includes sensor 902, processing circuitry 910, power supply 920, communication element 930, signal conditioner 940, accelerometer 960, and memory device 970. Although FIG.

9 depicts device 900 having sensor 902, device 900 may include a transceiver in addition to or in the alternative to sensor 902.

Processing circuitry 910 is configured to determine the length of a brake assembly's wear pin indicator. Processing circuitry 910 is configured to receive an output signal from sensor 902 and determine a length of a wear pin indicator based on the output signal. Processing circuitry 910 can determine the remaining use based on the length of the wear pin indicator and a rate of wear stored to memory device 970. Processing circuitry 910 may determine the remaining use in terms of the number of braking events.

Using this determined distance, processing circuitry 910 may be configured to determine the remaining length of the wear pin indicator by comparing the current distance measurement to an initial or previous distance or length measurement. Processing circuitry 910 may also be configured to transmit the determined current length of the wear pin indicator, along with a timestamp indicative of the time at which the current length measurement was made, to be stored within memory device 970.

Processing circuitry 910 may further be configured to retrieve from memory device 970 a previous set of estimated remaining use data and use the data in conjunction with a current measurement in order to determine a rate of change of the estimated remaining use during the time between which the different measurements were conducted. Processing circuitry 910 may then transmit the rate-of-change data to be stored in memory device 970 along with the current estimated remaining use and time data. Processing circuitry 910 may determine whether the estimated remaining use is less than a threshold amount and/or the length of the wear pin indicator is less than a threshold length stored to memory device 970, and processing circuitry 910 may generate an alert in response to determining that the estimated remaining use is less than a threshold amount and/or the length of the wear pin indicator is less than the threshold length. Processing circuitry 910 may cause communication element 930 to transmit the alert to an external device. Processing circuitry 910 may also be configured to determine that the estimated remaining use is less than a threshold amount and/or the length of the wear pin indicator is greater than the threshold length and refrain from generating the alert in response to determining that the estimated remaining use is less than a threshold amount and/or the length of the wear pin indicator is greater than the threshold length. In some examples, a determination that the estimated remaining use is less than a threshold amount and/or the length is less than the threshold length includes a determination that the estimated remaining use and/or the length is less than or equal than the threshold amount or the threshold length.

In some examples, processing circuitry 910 may perform data analysis on the data indicating the length of the wear pin indicator. For example, processing circuitry 910 may use data indicating the number of braking events, the weather conditions during each braking event, the vehicle operator during each braking event, the type of surface for each braking event (asphalt, concrete, etc.), and/or any other data stored to memory device 970. Processing circuitry 910 may determine metrics such as the rate of wear and the estimated remaining use of the wear pin indicator. Processing circuitry 910 may also determine whether and when to generate alerts regarding the status of the wear pin indicator and/or the vehicle's brake assembly.

Processing circuitry 910 may be further configured to cause device 900 to perform a measurement of the length of the wear pin indicator automatically (e.g., without a human operator). For example, a measurement of the length of the wear pin indicator may occur automatically when the brakes of the brake assembly are applied. Processing circuitry 910 may be configured to determine when the brakes are applied and to cause, without human intervention, sensor 902 to generate an output signal when the brakes are applied.

Memory device 970 is a non-transitory computer-readable medium capable of storing information indicative of the length of wear pin indicator along with a timestamp indicating the time at which the measurement was made. Memory device 970 may be further configured to store multiple sets of length and time data, as well as rates of change of the length of wear pin indicator between subsequent measurements. Memory device 970 may also store threshold amounts, threshold lengths, and threshold distances that processing circuitry 910 may use to determine if the wear pin indicator is approaching the end of its useful life. In some examples, memory device 970 stores data relating to braking events and weather conditions. Memory device 970 may also store reference data indicating an initial remaining use and/or an initial length of the wear pin indicator or a distance between a transceiver and a reflector element. In some examples, it may be acceptable for the surface of the wear pin indicator to reach the edge of the brake carrier, or there may a particular distance from the edge of the brake carrier for the wear pin indicator at which the brakes should be replaced.

Communication element 930 may output any or all of the collected measurements, determined data, and/or generated alerts to an external receiver (e.g., an external device). An external receiver may consist of a computing system, such as the avionics bay of an aircraft, to perform data analysis on data relating to the wear pin indicator and/or the vehicle's brake assembly. Alternatively or additionally, communication element 930 may output the data or generated alerts to a display device, to be observed by, for example, a pilot, driver, or mechanic. Communication element 930 may consist of a hard-wired system, such as wires or fiber-optic cable and/or a wireless communication system, such as Wi-Fi, Bluetooth, radio-frequency (RF) communication, RF identification (RFID), near-field communication (NFC), or any other electromagnetic signal.

Communication element 930 may be configured to transmit the determined estimate of remaining use, the determined wear pin indicator length measurement, and the time information to various other systems and interfaces for further use. For example, communication element 930 may be configured to transmit the wear pin indicator length and a corresponding predicted remaining brake lifespan, or an estimated remaining number of braking events for display in avionics bay of an aircraft on which the brake assembly on which the measurement was made. A log of wear pin indicator measurements may be stored to analyze braking and wear trends over time. A memory device may store this data, or communication element 930 can transmit the data offsite to cloud storage for wider access by the airline. A fleet manager can use the wear pin indicator measurement data for further analytics, for example, to monitor the rate and trend at which brake wear is happening per braking event. Based on the trend data airline can predict how many more takeoffs or landings can be performed before brake maintenance or brake replacements are required.

Another example application of enhanced data analytics is to design a customized training plan for pilots for cases where considerable amount of brake pin wear is observed frequently during landings and are attributed to judgment error of vehicle operators, for example, landing the aircraft long and applying hard brakes to stop the aircraft under normal weather conditions. Data analytics may associate each braking event with data such as vehicle operator, weather conditions, runway length, runway surface type (asphalt, concrete, etc.), runway conditions, and/or other relevant data. Data analytics may determine which vehicle operators are "hard brakers" based on the rate of wear associated with each vehicle operator and each braking event.

Another example application of enhanced data analytics is to design and implement an improved pricing mechanism. The wear pin indicator measurement trend data, combined with operating conditions data, for example, runway data, contamination data, weather, and climate conditions, may be used by brake suppliers to design a better pricing mechanism. For example, if the brake system is used in harsh or severe weather or runway conditions, the tendency of hard braking would be higher, and the brakes would wear down faster. Knowing such details, a brake supplier could implement a pricing system based on an estimated cost per braking event. The pricing system can be tailored to the individual needs and environments of each customer. For example, an original equipment manufacturer (OEM) may determine pricing and the terms of annual maintenance contracts based on data determined by processing circuitry 910.

Another application of the wear pin indicator measurement data is for use by a maintenance technician. Determined brake data may be sent to a handheld device, for example a device dedicated solely to brake assembly data, or alternatively, a multi-purpose device such as a smartphone. Maintenance operations may use the information to monitor when the brake assembly is due for maintenance or replacement, and prepare the replacement parts, thereby reducing the turnaround time and aircraft downtime.

In some examples, a computing device (e.g., processing circuitry 910) and/or an application may be configured to determine multiple lengths of the wear pin indicator over time. For example, processing circuitry 910 may be configured to cause sensor 902 or a transceiver to monitor the length at a first time and a second time, where processing circuitry 910 determines a first length of the wear pin indicator based on the first time and the second time. Processing circuitry 910 may be further configured to cause sensor 902 or a transceiver to monitor the length of the wear pin indicator at a third time and a fourth time, where processing circuitry 910 determines a second length of the wear pin indicator based on the third time and the fourth time. Processing circuitry 910 may perform additional measurements of the length of the wear pin indicator.

Based on the multiple measurements of the length, the computing device and/or the application may determine a number of braking events between measurements based on records of the vehicle operation. The computing device and/or the application may determine a rate of wear based on the lengths and the number of braking events. The rate of wear may indicate whether the vehicle operator is a hard braker. The presence or absence of other factors such as weather, surface type, and/or surface conditions can also affect the rate of wear. The computing device and/or the application may store the lengths and the rate of wear to a memory device such as memory device 970. If the computing device and/or the application determines that the rate of wear exceeds a threshold rate, the computing device and/or the application can generate an alert.

The computing device and/or the application may determine an estimated remaining use on a brake assembly based on the length(s) and/or the rate of wear. Other factors that affect the estimated remaining use include the expected type of operation in the future, the expected weather conditions in the future (e.g., based on location and time of year), and expected surface types in the future. The computing device and/or the application may determine the remaining use in terms of time (e.g., a number of days or weeks) or in terms of the number of remaining braking events (e.g., ten remaining landings before replacement).

Attachment element 950 connects device 900 to the external carrier of a vehicle's brake assembly, such that sensor 902 and/or a transceiver is not capable of moving with respect to the external carrier. The connection between device 900 and the brake assembly may be a rigid connection or there may be some flexibility to the connection. Attachment element 950 may be connected to the brake assembly by any appropriately permanent means, for example, by mounting, screwing, welding, gluing, taping, soldering, and/or any other attaching technique. In some examples, attachment element 950 includes an electro-mechanical element, such as a solenoid configured to provide attachment means in response to an electrical current.

There are different types of brake systems available depending on the type of aircraft, ranging from single disc brakes to segmented rotor brakes and carbon brakes. For simple brake systems, wear determination can include visually inspecting the brake disc. For complex brake systems, the brake assembly may include a wear pin indicator to help device 900 to determine the brake wear. The wear pin indicator protrudes out via brake carrier or a carrier element. Device 900 can be mounted on the brake carrier or the carrier element rigidly such that the device 900 does not move and sensor 902 and/or a transceiver is positioned directly above the wear pin indicator and configured to transmit and receive the return signal.

Power supply 920 delivers electrical power to drive device 900. Power supply 920 may consist of an external battery, such as a lithium-ion battery or any lithium-based chemistry battery. Alternatively, power supply 920 may consist of an existing power source that is delivering power to the rest of the wheel-and-brake assembly. Alternatively, power supply 920 may consist of a system for passively harvesting energy emitted by the rest of the brake assembly. An example of such a passive energy source may include thermo-electric generators (TEG) or vibration or electromagnetic power sources. Additionally, capacitors (e.g., supercapacitors) may be used as an energy storage device and auxiliary power source for the system. Device 900 may be configured to use low amounts of power, operating only in conjunction with a harvested energy source or with a battery. For example, the sampling period of any sensor output monitoring may be optimized to save energy by drawing power only during the sampling period, and the sensor may operate in a "sleep mode" at all other times.

Accelerometer 960 may be configured to detect the acceleration of device 900. Processing circuitry 910 may be configured to determine the acceleration of device 900 based on a signal received from accelerometer 960. Processing circuitry 910 may be configured to wait until acceleration is low or zero to perform measurements of a wear pin indicator. Vibrations and movement can affect the measurements. In the example of an aircraft brake assembly, processing circuitry 910 may be configured to perform measurements in the air during flight.

Figure 10:
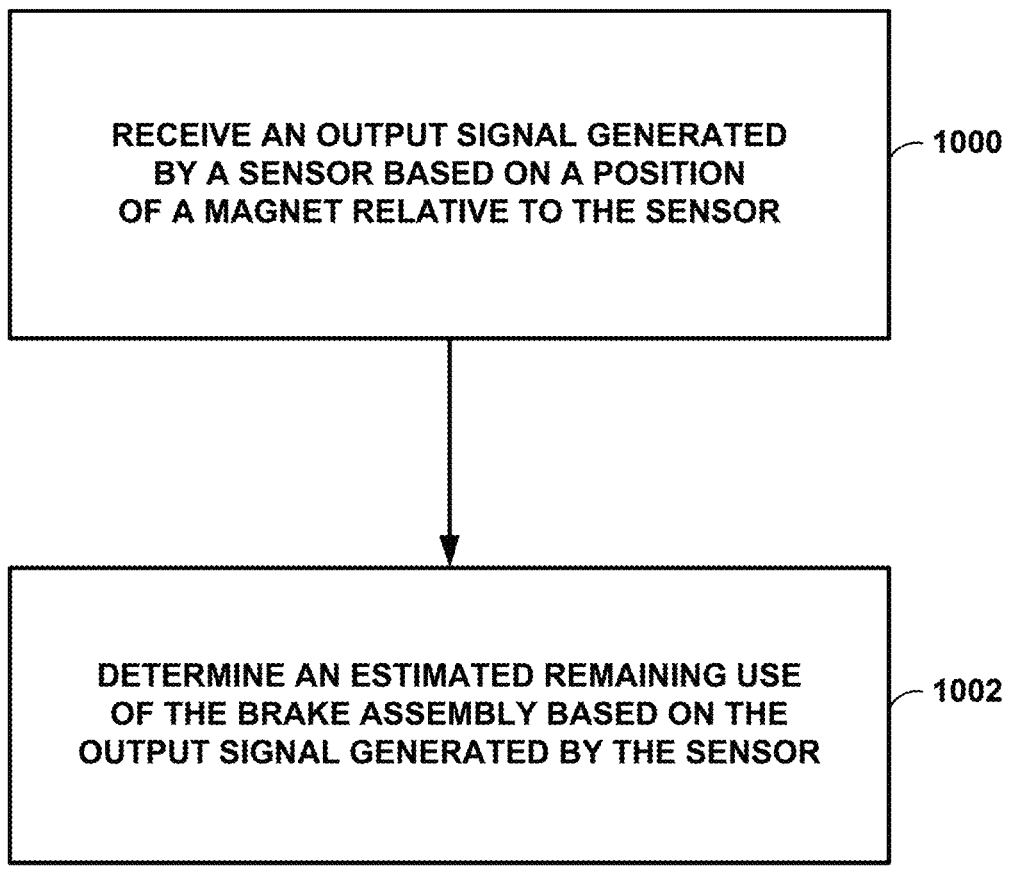
FIGS. 10 and 11 are flowcharts depicting a method of measuring the length of a wear pin indicator, in accordance with some examples of this disclosure.
Figure 11:
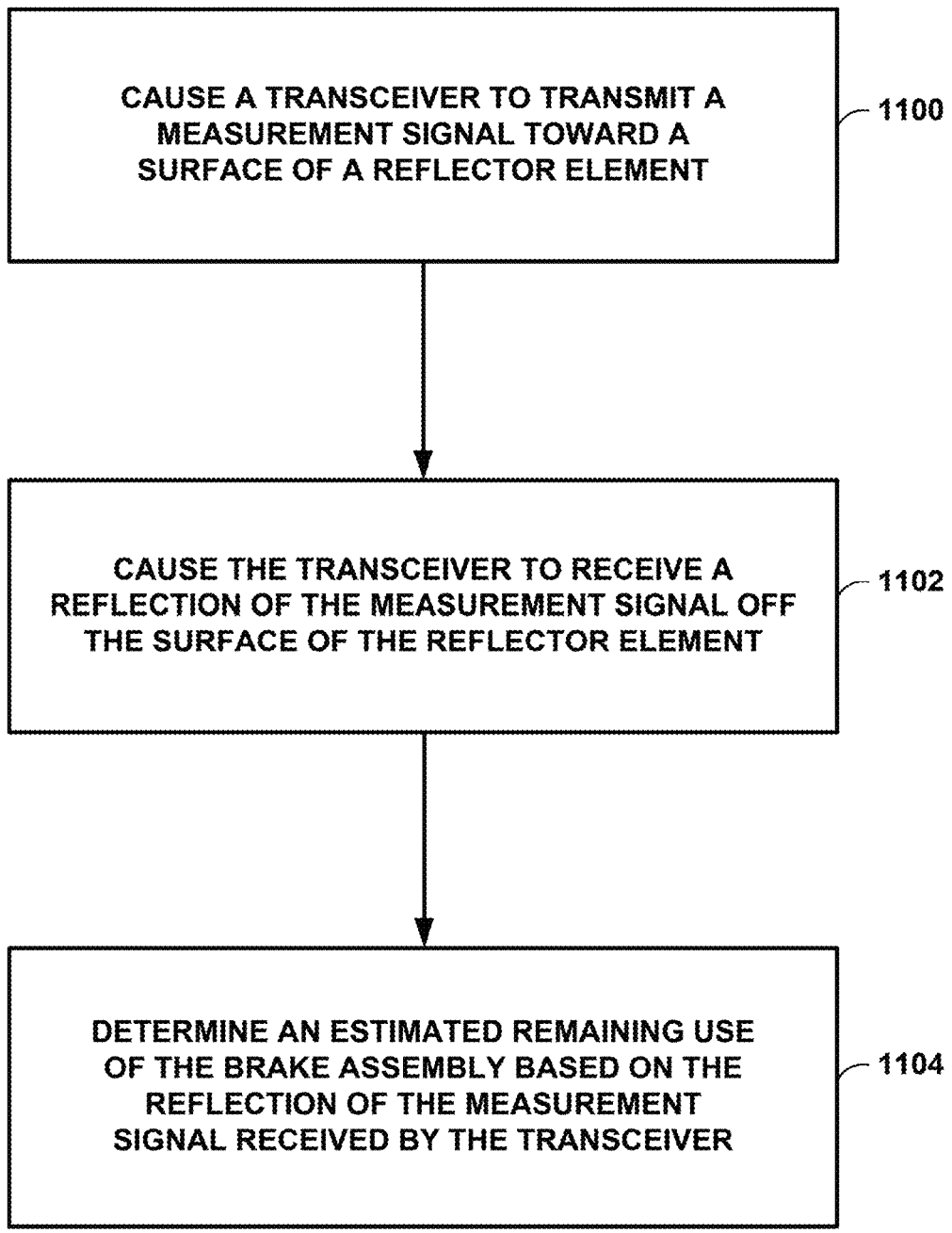

FIGS. 10 and 11 are flowcharts depicting a method of measuring the length of a wear pin indicator, in accordance with some examples of this disclosure. The technique of FIG. 10 is described with reference to device 100 of FIG. 1A, although devices 200, 300, 400, 500, 600, 700, and 900 may also perform similar techniques. The technique of FIG. 11 is described with reference to device 600 of FIG. 6A, although devices 100, 200, 300, 400, 500, 700, and 900 may also perform similar techniques.

In the example of FIG. 10, processing circuitry 110 receives output signal 106 generated by sensor 102 based on a position of magnet 120 relative to sensor 102 (1000). An amplitude of output signal 106 may be based on the position of magnet 120 relative to sensor 102. If sensor 102 includes more than one sensor element, sensor 102 may be configured to generate more than one output signal. The amplitude of each output signal may be based on the position of magnet 120 relative to the respective sensor element of array 104 that generates the output signal. Thus, output signal 106 may include more than one output signal.

In the example of FIG. 10, processing circuitry 110 determines an estimated remaining use of the brake assembly based on output signal 106 generated by the sensor 102 (1002). Processing circuitry 110 can determine the estimated remaining use of the brake assembly directly from output signal 106, or processing circuitry 110 may first determine remaining wear length 132 based on output signal 106.

In the example of FIG. 11, microcontroller 610 causes transceiver 670 to transmit sonic wave 614 (e.g., a measurement signal) toward the surface of reflector element 672 (1100). Sonic wave 614 may include a pulse, such as excitation pulse 680 shown in FIG. 6B. In some examples, microcontroller 610 can cause a transceiver to transmit an infrared signal, an ultrasonic signal, a piezoelectric signal, and/or any other suitable signal.

In the example of FIG. 11, microcontroller 610 causes transceiver 670 to receive reflected sonic wave 616 off the surface of reflector element 672 (1102). Reflected sonic wave 616 may include a pulse, such as detected pulse 682 shown in FIG. 6B. Microcontroller 610 may be configured to use counter pulses 692 to determine the time difference between the transmission of sonic wave 614 and the reception of reflected sonic wave 616.

In the example of FIG. 11, microcontroller 610 determines the estimated remaining use of the brake assembly based on reflected sonic wave 616 received by transceiver 670 (1104). Microcontroller 610 may be configured to determine length 674 by dividing the time difference by two and multiplying by the velocity of sonic wave 614 (see Equation (1) above). Microcontroller 610 may then be configured to determine remaining wear pin length 632 using Equation (2) and the remaining use of the brake assembly using Equation (3)

The following numbered examples demonstrate one or more aspects of the disclosure.

Example 1. A device includes a magnet configured to move in response to movement of a wear pin indicator of the brake assembly, a sensor configured to generate an output signal based on a position of the magnet relative to the sensor; and processing circuitry configured to determine the estimated remaining use of the brake assembly based on the output signal generated by the sensor.

Example 2. The device of example 1, wherein the magnet is configured to move laterally in response to the movement of the wear pin indicator Example 3. The device of examples 1-2 or any combination thereof, wherein the sensor includes an array of sensor elements.

Example 4. The device of example 3, wherein each sensor element of the array of sensor elements is configured to generate a respective output signal based on the position of the magnet relative to the respective sensor element.

Example 5. The device of example 4, wherein the processing circuitry is configured to determine the estimated remaining use of the brake assembly based on the output signals generated by the array of sensor elements.

Example 6. The device of examples 3-5 or any combination thereof, wherein each sensor element of the array of sensor elements is spaced apart from an adjacent sensor element of the array of sensor elements by an air gap.

Example 7. The device of examples 1-6 or any combination thereof, wherein the magnet is coupled to an exposed end of the wear pin indicator.

Example 8. The device of examples 1-7 or any combination thereof, further including a spring configured to expand or compress in response to movement of the wear pin indicator.

Example 9. The device of example 8, further including a mounting element coupled to an end of the spring and configured to move laterally in response to the movement of the wear pin indicator.

Example 10. The device of example 9, wherein the magnet is coupled to the mounting element.

Example 11. The device of examples 1-10 or any combination thereof, further including a detachable anchor coupled to an exposed end of the wear pin indicator.

Example 12. The device of examples 8-11 or any combination thereof, wherein the mounting element includes a piston loaded in the spring.

Example 13. The device of example 12, wherein the piston is attached to the detachable anchor.

Example 14. The device of examples 1-13 or any combination thereof, further including a rotational element configured to rotate in response to the movement of the wear pin indicator.

Example 15. The device of example 14, wherein the magnet is attached to the rotational element and configured to rotate in response to the movement of the wear pin indicator.

Example 16. The device of examples 1-15 or any combination thereof, and wherein the sensor is configured to generate the output signal based on an angle of the magnet relative to the sensor.

Example 17. The device of examples 1-16 or any combination thereof, wherein the magnet is positioned along an axis of rotation of the rotational element.

Example 18. The device of examples 1-17 or any combination thereof, further including a tensile element having a first end and a second end.

Example 19. The device of example 18, wherein the first end of the tensile element is coupled to an exposed end of the wear pin indicator.

Example 20. The device of examples 18-19 or any combination thereof, wherein the second end of the tensile element is wrapped around the rotational element causing the rotational element to rotate when the wear pin indicator moves.

Example 21. The device of examples 1-20 or any combination thereof, wherein the sensor includes an anisotropic magnetoresistive sensor.

Example 22. A device includes a reflector element configured to move in response to movement of a wear pin indicator of the brake assembly, a transceiver configured to transmit a measurement signal toward a surface of the reflector element and receive a reflection of the measurement signal off the surface, and processing circuitry configured to determine the estimated remaining use of the brake assembly based on the reflection of the measurement signal received by the transceiver.

Example 23. The device of example 22, wherein the reflector element is configured to move laterally in response to the movement of the wear pin indicator.

Example 24. The device of examples 22-23 or any combination thereof, wherein the transceiver is configured to transmit the measurement signal toward the surface at a first time and receive the reflection of the measurement signal from the surface at a second time.

Example 25. The device of examples 22-24 or any combination thereof, wherein the processing circuitry is configured to determine a difference of the first time and the second time and determine the estimated remaining use of the brake assembly based on the difference of the first time and the second time.

Example 26. The device of examples 22-25 or any combination thereof, wherein the processing circuitry is further configured to determine a length of the wear pin indicator based on the difference of the first time and the second time, and wherein the processing circuitry is configured to determine the estimated remaining use of the brake assembly based on the length of the wear pin indicator.

Example 27. The device of examples 22-26 or any combination thereof, further including a spring configured to hold the reflector element in contact with an exposed end of the wear pin indicator.

Example 28. The device of examples 22-27 or any combination thereof, wherein the reflector element is coupled to an exposed end of the wear pin indicator.

Example 29. The device of examples 22-28 or any combination thereof, wherein the measurement signal includes an ultrasonic signal.

Example 30. The device of examples 22-29 or any combination thereof, wherein the measurement signal includes an infrared electromagnetic signal, and wherein the transceiver includes an infrared sensor.

Example 31. A method includes receiving an output signal generated by a sensor based on a position of a magnet relative to the sensor, wherein the magnet is configured to move in response to movement of a wear pin indicator of the brake assembly, and determining an estimated remaining use of the brake assembly based on the output signal generated by the sensor.

Example 32. The method of example 31, wherein receiving the output signal includes receiving a respective output signal from each sensor element of an array of sensor elements based on the position of the magnet relative to the respective sensor element, wherein determining the estimated remaining use of the brake assembly is based on the respective output signals generated by the array of sensor elements.

Example 33. The method of examples 31-32 or any combination thereof, determining a length of a wear pin indicator based on the output signal generated by the sensor, and determining the remaining use of the brake assembly based on the length of the wear pin indicator.

Example 34. A device configured to perform the method of examples 31-33 or any combination thereof.

Example 35. A device includes a computer-readable medium having executable instructions stored thereon, wherein the instructions are configured to be executable by one or more processors for causing the one or more processors to receive an output signal generated by a sensor based on a position of a magnet relative to the sensor. The instructions are configured to be executable by the processing circuitry for further causing the processing circuitry to determine an estimated remaining use of a brake assembly based on the output signal.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry 110, 210, 310, and 910 and microcontroller 610 may be implemented in any of a variety of types of solid state circuit elements, such as CUPS, CPU cores, GNUS, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Devices 100, 200, 300, 400, 500, 600, 700, and 900 may include one or more memory devices, such as memory device 970, that include any volatile or non-volatile media, such as a RAM, ROM, non-volatile RAM (NVRAM), electrically erasable programmable ROM (EEPROM), flash memory, and the like. Memory device 970 may store computer-readable instructions that, when executed by processing circuitry, cause the processing circuitry to implement the techniques attributed herein to processing circuitry 110, 210, 310, and 910 and microcontroller 610.

Elements of processing circuitry 110, 210, 310, and 910 and microcontroller 610, and/or memory device 970 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 110, 210, 310, and 910 and microcontroller 610, and/or memory device 970 as in any of the examples herein may be implemented as a device, a system, an apparatus, and may embody or implement a method of determining an estimated altitude of a melting layer.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Various examples of the disclosure have been described. Any combination of the described systems, operations, or functions is contemplated. These and other examples are within the scope of the following claims.

What is claimed is:

1. A device configured to determine an estimated remaining use of a brake assembly, the device comprising:
    a magnet configured to move in response to movement of a wear pin indicator of the brake assembly, wherein a position of the magnet corresponds to a remaining wear length of the wear pin indicator, and wherein the remaining wear length decreases with use of the brake assembly;
a sensor configured to generate an output signal based on the position of the magnet relative to the sensor; and
processing circuitry configured to determine the estimated remaining use of the brake assembly based on the output signal generated by the sensor.

2. The device of claim 1,
wherein the magnet is configured to move laterally in response to the movement of the wear pin indicator,
wherein the sensor comprises an array of sensor elements, wherein each sensor element of the array of sensor elements is configured to generate a respective output signal based on the position of the magnet relative to the respective sensor element, and
wherein the processing circuitry is configured to determine the estimated remaining use of the brake assembly based on the output signals generated by the array of sensor elements.

3. The device of claim 2, wherein each sensor element of the array of sensor elements is spaced apart from an adjacent sensor element of the array of sensor elements by an air gap.

4. The device of claim 1, wherein the magnet is coupled to an exposed end of the wear pin indicator.

5. The device of claim 1, further comprising:
a spring configured to expand or compress in response to movement of the wear pin indicator; and
a mounting element coupled to an end of the spring and configured to move laterally in response to the movement of the wear pin indicator; and
wherein the magnet is coupled to the mounting element, and
wherein the mounting element is configured to move in a same direction as the movement of the wear pin indicator.

6. The device of claim 5, further comprising a detachable anchor coupled to an exposed end of the wear pin indicator,
wherein the mounting element comprises a piston loaded in the spring, and
wherein the piston is attached to the detachable anchor.

7. The device of claim 1, further comprising a rotational element configured to rotate in response to the movement of the wear pin indicator,
wherein the magnet is attached to the rotational element and configured to rotate in response to the movement of the wear pin indicator; and
wherein the sensor is configured to generate the output signal based on an angle of the magnet relative to the sensor.

8. The device of claim 7, wherein the magnet is positioned along an axis of rotation of the rotational element.

9. The device of claim 7, further comprising a tensile element having a first end and a second end,
wherein the first end of the tensile element is coupled to an exposed end of the wear pin indicator, and
wherein the second end of the tensile element is wrapped around the rotational element causing the rotational element to rotate when the wear pin indicator moves.

10. The device of claim 1, wherein the sensor comprises an anisotropic magnetoresistive sensor.

11. The device of claim 1,
wherein the output signal indicates the remaining wear length of the wear pin indicator, and
wherein the remaining wear length of the wear pin indicator corresponds to the estimated remaining use of the brake assembly.

12. The device of claim 1, wherein the processing circuitry is configured to:
determine an estimate of wear per braking event based on measurements of the position of the magnet and a number of braking events between the measurements of the position of the magnet; and
determine the estimated remaining use based on the remaining wear length and further based on the wear per braking event.

13. The device of claim 1,
wherein the wear pin indicator is coupled to a pressure plate of the brake assembly, and
wherein the pressure plate is pushed against a brake lining of the brake assembly by a hydraulic system, thereby generating friction between a pad of the brake lining and a rotating component of a wheel.

14. A method of determining an estimated remaining use of a brake assembly, the method comprising:
receiving an output signal generated by a sensor based on a position of a magnet relative to the sensor, wherein the magnet is configured to move in response to movement of a wear pin indicator of the brake assembly, wherein a position of the magnet corresponds to a remaining wear length of the wear pin indicator, and wherein the remaining wear length decreases with use of the brake assembly; and
determining an estimated remaining use of the brake assembly based on the output signal generated by the sensor.

15. The method of claim 14,
wherein receiving the output signal comprises receiving a respective output signal from each sensor element of an array of sensor elements based on the position of the magnet relative to the respective sensor element,
wherein determining the estimated remaining use of the brake assembly is based on the respective output signals generated by the array of sensor elements.

16. The method of claim 14, further comprising:
determining a length of a wear pin indicator based on the output signal generated by the sensor; and
determining the remaining use of the brake assembly based on the length of the wear pin indicator.

17. A device configured to determine an estimated remaining use of a brake assembly, the device comprising:
a spring configured to expand or compress in response to movement of a wear pin indicator of the brake assembly;
a mounting element coupled to an end of the spring and configured to move laterally in response to the movement of the wear pin indicator, wherein the mounting element is configured to move in a same direction as the movement of the wear pin indicator;
a magnet coupled to the mounting element, wherein a position of the magnet corresponds to a remaining wear length of the wear pin indicator, and wherein the remaining wear length decreases with use of the brake assembly, and wherein the remaining wear length of the wear pin indicator corresponds to the estimated remaining use of the brake assembly;
a sensor configured to generate an output signal based on the position of the magnet relative to the sensor; and
processing circuitry configured to determine the estimated remaining use of the brake assembly based on the output signal generated by the sensor.

18. The device of claim 17, further comprising a detachable anchor coupled to an exposed end of the wear pin indicator,
- wherein the mounting element comprises a piston loaded in the spring, and
- wherein the piston is attached to the detachable anchor.

19. The device of claim 17,
- wherein the mounting element is coupled to a first end of the spring, and
- wherein a second end of the spring is coupled to a brake carrier of the brake assembly.

20. The device of claim 17,
- wherein the wear pin indicator is coupled to a pressure plate of the brake assembly, and
- wherein the pressure plate is pushed against a brake lining of the brake assembly by a hydraulic system, thereby generating friction between a pad of the brake lining and a rotating component of a wheel.

\* \* \* \* \*